US012634867B2

(12) United States Patent
Manolakos et al.

(10) Patent No.: US 12,634,867 B2
(45) Date of Patent: May 19, 2026

(54) ASSOCIATION BETWEEN NR PRS AND LTE CRS IN DYNAMIC SPECTRUM SHARING

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 18/005,331

(22) PCT Filed: Sep. 2, 2021

(86) PCT No.: PCT/US2021/048823
§ 371 (c)(1),
(2) Date: Jan. 12, 2023

(87) PCT Pub. No.: WO2022/072115
PCT Pub. Date: Apr. 7, 2022

(65) Prior Publication Data
US 2023/0269694 A1 Aug. 24, 2023

(30) Foreign Application Priority Data
Sep. 29, 2020 (IN) .............................. 202041042299

(51) Int. Cl.
*H04W 64/00* (2009.01)
*G01S 5/02* (2010.01)
*H04L 5/00* (2006.01)

(52) U.S. Cl.
CPC ........... *H04W 64/00* (2013.01); *G01S 5/0236* (2013.01); *H04L 5/0051* (2013.01); *G01S 2205/008* (2013.01)

(58) Field of Classification Search
CPC ..... H04W 64/00; H04W 16/14; H04W 88/06; G01S 5/0236; G01S 2205/008; G01S 5/0258; H04L 5/0051
See application file for complete search history.

(56) References Cited

U.S. PATENT DOCUMENTS

| | | | |
|---|---|---|---|
| 2019/0393970 A1 | 12/2019 | Kumar et al. | |
| 2020/0150254 A1 | 5/2020 | Manolakos et al. | |
| 2022/0166656 A1 * | 5/2022 | Cha ........................ | H04W 64/00 |

FOREIGN PATENT DOCUMENTS

| | | | | |
|---|---|---|---|---|
| WO | WO-2020177521 A1 * | 9/2020 | ........... | H04L 5/0053 |
| WO | WO-2021173348 | 9/2021 | | |

OTHER PUBLICATIONS

Huawei: "Remaining Issues on DL Based Positioning", 3GPP Draft, 3GPP TSG RAN WG1 Meeting #96, R1-1901574, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, (Year: 2019).*

(Continued)

*Primary Examiner* — Umair Ahsan
(74) *Attorney, Agent, or Firm* — Weaver Austin Villeneuve & Sampson LLP

(57) ABSTRACT

A method of using reference signals from different radio access technologies (RATs) for user equipment (UE) positioning includes, by the UE, receiving assistance data indicating an association between first reference signals of a first RAT and second reference signals of a second RAT in a frequency band, determining that the first reference signals and the second reference signals are deployed in the frequency band based on the assistance data, receiving the first reference signals and the second reference signals in the frequency band from one or more network nodes, determining the association between the first reference signals and (Continued)

the second reference signals based on configuration data, and determining positioning data associated with the location of the UE based on the determined association and both the received first reference signals and the received second reference signals.

30 Claims, 18 Drawing Sheets

(56)                    References Cited

OTHER PUBLICATIONS

Fischer S., "Observed Time Difference of Arrival (OTDOA) Positioning in 3GPP LTE", Jun. 6, 2014 (Jun. 6, 2014), pp. 1-62, XP055549372, Retrieved from the Internet: URL: https://www.qualcomm.com/media/documents/files/otdoa-positioning-in-3gpp-lte.pdf [retrieved on Jan. 30, 2019] section 7.

Huawei: "Remaining Issues on DL Based Positioning", 3GPP Draft, 3GPP TSG RAN WG1 Meeting #96, R1-1901574, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019, XP051599271, 8 Pages, Sections: 1. Introduction; 2.1 New DL-RS for Positioning; 3 OTDOA Measurements and Reporting.
International Search Report and Written Opinion—PCT/US2021/048823—ISA/EPO—Feb. 11, 2022.
Ferre, et al., "Positioning Reference Signal design for positioning via 5G," Oct. 2019, 5 pages.
Fischer, Sven, "Observed Time Difference of Arrival (OTDOA) Positioning in 3GPP LTE," Jun. 6, 2014, 62 pages.
Knutti, et al., "Positioning Using LTE Signals," 2015, 8 pages.
Mediatek, "5G NR and 4G LTE Coexistence. White Paper: A Comprehensive Deployment Guide to Dynamic Spectrum Sharing," MediaTek, 2020, 30 pages.
Nokia , "Nokia dynamic spectrum sharing for rapid 5G coverage rollout, White Paper," 2020, 12 pages.
Qorvo, "Evolution of Carrier Aggregation (CA) for 5G What's New in Mobile CA," Qorvo, Feb. 2020, 4 pages.

* cited by examiner

Comb-2 with 2 symbols    Comb-4 with 4 symbols    Comb-2 with 12 symbols    Comb-4 with 12 symbols Comb-6 with 6 symbols    Comb-12 with 12 symbols    Comb-2 with 6 symbols    Comb-6 with 12 symbols DL-PRS Resource Symbol Offset=3

PRS

CRS

FIG. 11C

PRS

CRS

FIG. 11B

PRS

CRS

FIG. 11A

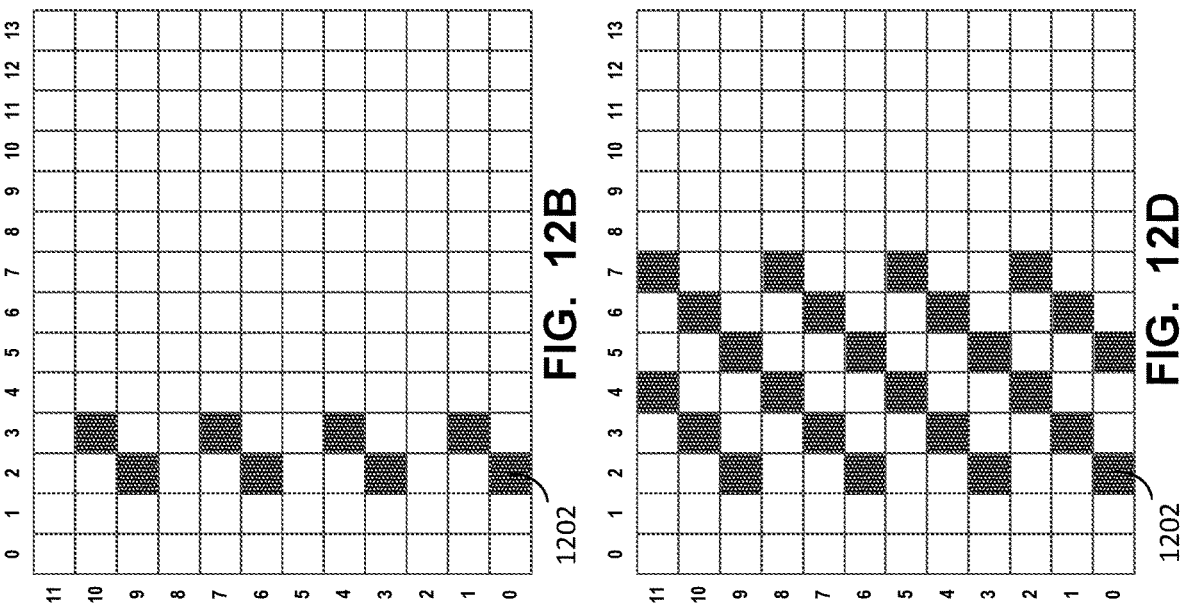
FIG. 12B
FIG. 12D
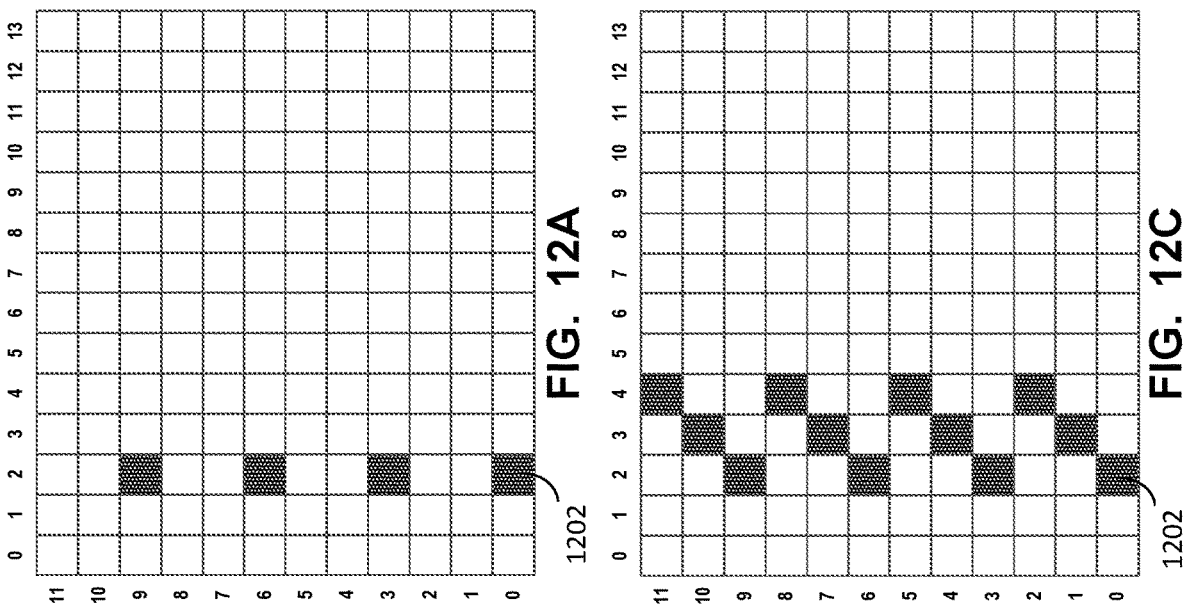
FIG. 12A
FIG. 12C

1500

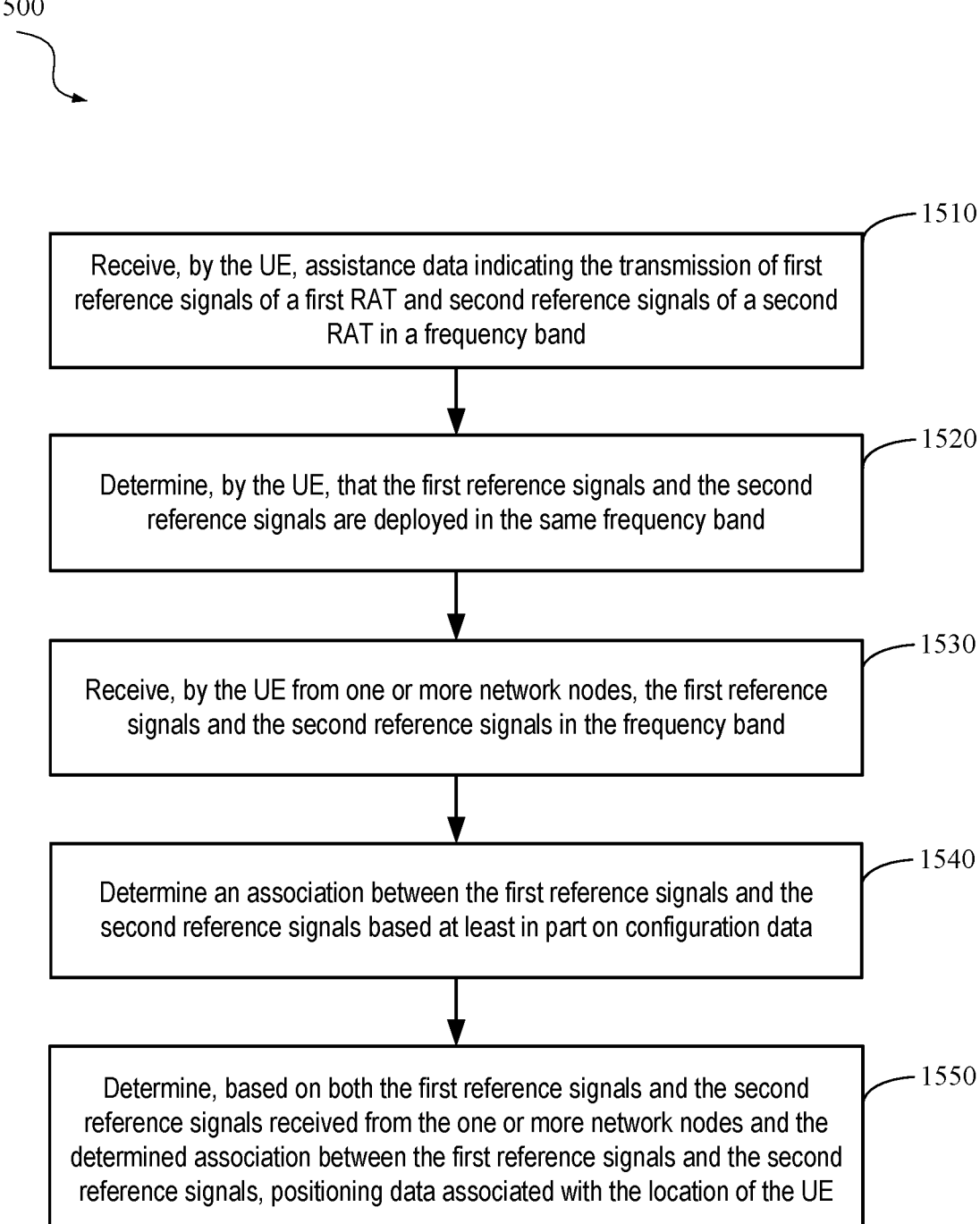

1510

Receive, by the UE, assistance data indicating the transmission of first reference signals of a first RAT and second reference signals of a second RAT in a frequency band

1520

Determine, by the UE, that the first reference signals and the second reference signals are deployed in the same frequency band

1530

Receive, by the UE from one or more network nodes, the first reference signals and the second reference signals in the frequency band

1540

Determine an association between the first reference signals and the second reference signals based at least in part on configuration data

1550

Determine, based on both the first reference signals and the second reference signals received from the one or more network nodes and the determined association between the first reference signals and the second reference signals, positioning data associated with the location of the UE

FIG. 15

ASSOCIATION BETWEEN NR PRS AND LTE CRS IN DYNAMIC SPECTRUM SHARING

BACKGROUND

This disclosure relates generally to wireless communications, and more specifically, to determining the location of a User Equipment (UE) using radio frequency (RF) wireless signals.

For many years, UE positioning has been accomplished with Global Navigation Satellite Systems (GNSS) assisted by cellular networks. This approach can provide accurate positioning but is typically limited to outdoor areas with satellite visibility. There are a range of applications that may use accurate positioning for both outdoors and indoors. In both Long-Term Evolution (LTE) wireless networks and Fifth Generation (5G) New Radio (NR) wireless networks, network nodes (e.g., base stations or reference UEs) may transmit reference signals that can be measured by a UE to determine the location of the UE using a variety of network-based positioning methods. For example, in LTE wireless networks, Cell-specific Reference Signals (CRS) and Positioning Reference Signals (PRS) may be used for the positioning of a UE. In 5G NR wireless networks, PRS signals may also be used for the positioning of a UE.

SUMMARY

Various inventive embodiments for determining the location of a User Equipment (UE) using radio frequency (RF) wireless signals are described herein, including devices, systems, components, apparatuses, methods, materials, procedures, instructions, code, computer storage medium, and the like.

An example method of determining a location of a User Equipment (UE), according to this disclosure, may comprise receiving, by the UE, assistance data indicating transmission of first reference signals of a first Radio Access Technology (RAT) and second reference signals of a second RAT in a frequency band. The method also may comprise determining, by the UE based on the assistance data, that the first reference signals and the second reference signals are deployed in the frequency band. The method also may comprise receiving, by the UE from one or more network nodes, the first reference signals and the second reference signals in the frequency band. The method also may comprise determining an association between the first reference signals and the second reference signals based at least in part on configuration data. The method also may comprise determining, based on both the first reference signals and the second reference signals received from the one or more network nodes and the determined association between the first reference signals and the second reference signals, positioning data associated with the location of the UE.

An example User Equipment (UE) for determining a location of the UE, according to this disclosure, may comprise a transceiver, a memory, one or more processors communicatively coupled with the transceiver and the memory, wherein the one or more processors are configured to receive, via the transceiver, assistance data indicating transmission of first reference signals of a first Radio Access Technology (RAT) and second reference signals of a second RAT in a frequency band. The one or more processors further may be configured to determine that the first reference signals and the second reference signals are deployed in the frequency band. The one or more processors further may be configured to receive, via the transceiver from one or more network nodes, the first reference signals and the second reference signals in the frequency band. The one or more processors further may be configured to determine an association between the first reference signals and the second reference signals based at least in part on configuration data. The one or more processors further may be configured to determine, based on both the first reference signals and the second reference signals received from the one or more network nodes and the determined association between the first reference signals and the second reference signals, positioning data associated with the location of the UE.

An example apparatus for determining a location of a User Equipment (UE), according to this disclosure, may comprise means for receiving assistance data indicating transmission of first reference signals of a first Radio Access Technology (RAT) and second reference signals of a second RAT in a frequency band. The apparatus further may comprise means for determining that the first reference signals and the second reference signals are deployed in the frequency band. The apparatus further may comprise means for receiving, from one or more network nodes, the first reference signals and the second reference signals in the frequency band. The apparatus further may comprise means for determining an association between the first reference signals and the second reference signals based at least in part on configuration data. The apparatus further may comprise means for determining, based on both the first reference signals and the second reference signals received from the one or more network nodes and the determined association between the first reference signals and the second reference signals, positioning data associated with the location of the UE.

According to this disclosure, an example non-transitory computer-readable medium stores instructions for determining a location of a User Equipment (UE), the instructions comprising code for receiving assistance data indicating transmission of first reference signals of a first Radio Access Technology (RAT) and second reference signals of a second RAT in a frequency band. The instructions further may comprise code for determining that the first reference signals and the second reference signals are deployed in the frequency band. The instructions further may comprise code for receiving, from one or more network nodes, the first reference signals and the second reference signals in the frequency band. The instructions further may comprise code for determining an association between the first reference signals and the second reference signals based at least in part on configuration data. The instructions further may comprise code for determining, based on both the first reference signals and the second reference signals received from the one or more network nodes and the determined association between the first reference signals and the second reference signals, positioning data associated with the location of the UE.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures.

FIG. 1 is a simplified diagram of an example of a positioning system according to certain embodiments.

FIG. 4 illustrates an example of a frame structure for 5G NR.

FIGS. 11A-11C illustrate examples of frequency bands of LTE CRS and NR PRS signals that may be associated.

FIGS. 12A-12D illustrate examples of NR PRS structures in a resource block where the NR PRS signals may be associated with LTE CRS signals.

FIG. 15 is a flow diagram illustrating an example of a method of using associated LTE CRS and NR PRS in a component carrier for UE positioning according to certain embodiments.

Figure 2:
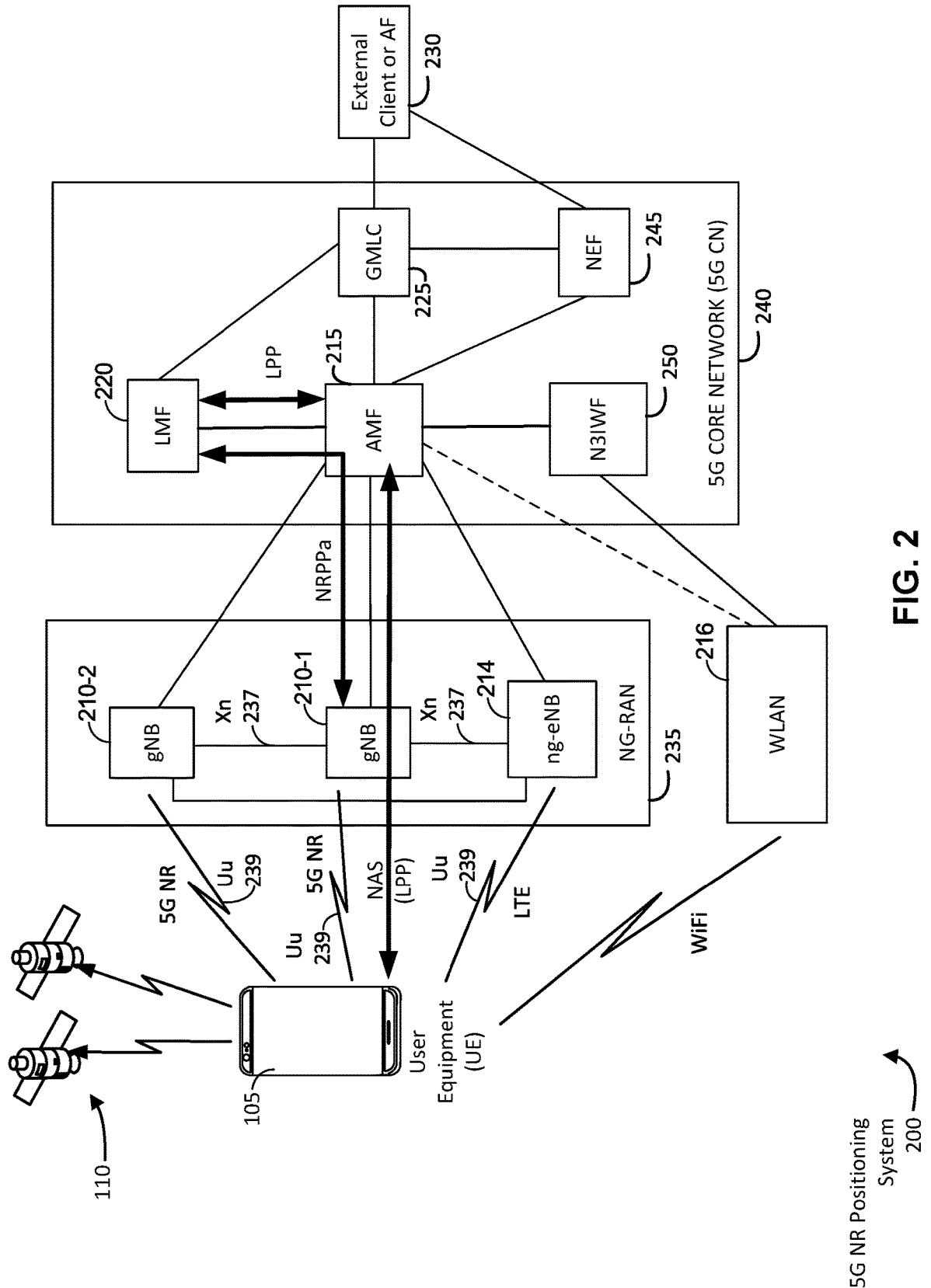
FIG. 2 is a diagram of an example of a positioning system using Fifth Generation (5G) New Radio (NR) according to certain embodiments.

In the figures, like reference numerals refer to like parts throughout various figures unless otherwise specified. In addition, multiple instances of a component may be distinguished by following the reference numeral by a second label (e.g., a letter or a number), or a dash and a second label. If only the first reference label is used in the specification, the description is applicable to any one of the similar components having the same first reference numeral irrespective of the second label.

DETAILED DESCRIPTION

Techniques disclosed herein generally to wireless communications, and more specifically, to determining the location of a User Equipment (UE) using radio frequency (RF) wireless signals. Various inventive embodiments are described herein, including devices, systems, components, apparatuses, methods, procedures, instructions, codes, computer-readable storage medium, and the like.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Dynamic spectrum sharing (DSS) techniques allow operators or service providers to use a same spectrum band for different radio access technologies (RATs). Dynamic spectrum sharing has started to be used for scaling out Fifth Generation (5G) networks quickly, rather than re-farming the low-band or mid-band spectrum used by LTE or earlier generation wireless networks for 5G connectivity. DSS techniques allow operators to operate LTE and 5G NR in the same band at the same time. DSS techniques also allow operators to dynamically adjust the amount of spectrum available to each technology based on user needs that can be assessed in real time and can be rapidly changing. Thus, DDS techniques can support LTE and 5G NR in the same band to make more efficient use of the finite spectrum resource and to achieve broad coverage with 5G services in existing low-band or mid-band spectrum. Similarly, DSS techniques may allow the share of a same band by 5G NR and the Six-Generation (6G) wireless.

According to certain embodiments, LTE reference signals, such as the Cell-specific reference signal (CRS), and 5G New Radio (NR) reference signals (e.g., positioning reference signal (PRS), Channel State Information Reference Signal (CSI-RS), Tracking Reference Signal (TRS), Demodulation Reference Signal (DMRS), or Synchronization Signal Block (SSB)) may be deployed in the same frequency band (e.g., component-carrier) for transmitting to a UE at the same time (e.g., in a same slot) using the DSS techniques. The NR PRS pattern of the PRS Resource Elements (REs) in a Resource Block (RB) may be designed around the LTE CRS REs through CRS rate matching to avoid collision with the LTE CRS REs. For example, various comb-3 PRS RE patterns may be used to fit REs for NR PRS around the REs for LTE CRS in each RB. The association and/or relationship between the LTE and 5G NR reference signals in the configured frequency band (e.g., component-carrier) may be transmitted by a serving next generation NodeB (gNB) or a location server (e.g., a location management function (LMF) server) to the UE as assistance data and/or configuration data. The UE may then determine that there is an association between the LTE CRS and NR PRS in the component carrier, and, based on the relationship described in the assistance data and/or the configuration data, receive and process the LTE and 5G NR reference signals to perform NR positioning measurements.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (or UT), a "mobile device," a "mobile terminal," a "mobile station," or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on IEEE 802.11, etc.), and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), and the like. In NR systems, the term "cell" and next generation NodeB (gNB), new radio base station (NR BS), 5G NB, access point (AP), or transmission reception point (TRP) may be used interchangeably. A base station may be used primarily to support wireless access by UEs, including supporting data, voice, and/or signaling connections for the supported UEs. In some systems, a base station may provide purely edge node signaling functions, while in other systems, a based station may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein, the term traffic channel (TCH) can refer to either an uplink/reverse or downlink/forward traffic channel.

In some embodiments, the term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency range that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In some instances, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Figure 1:
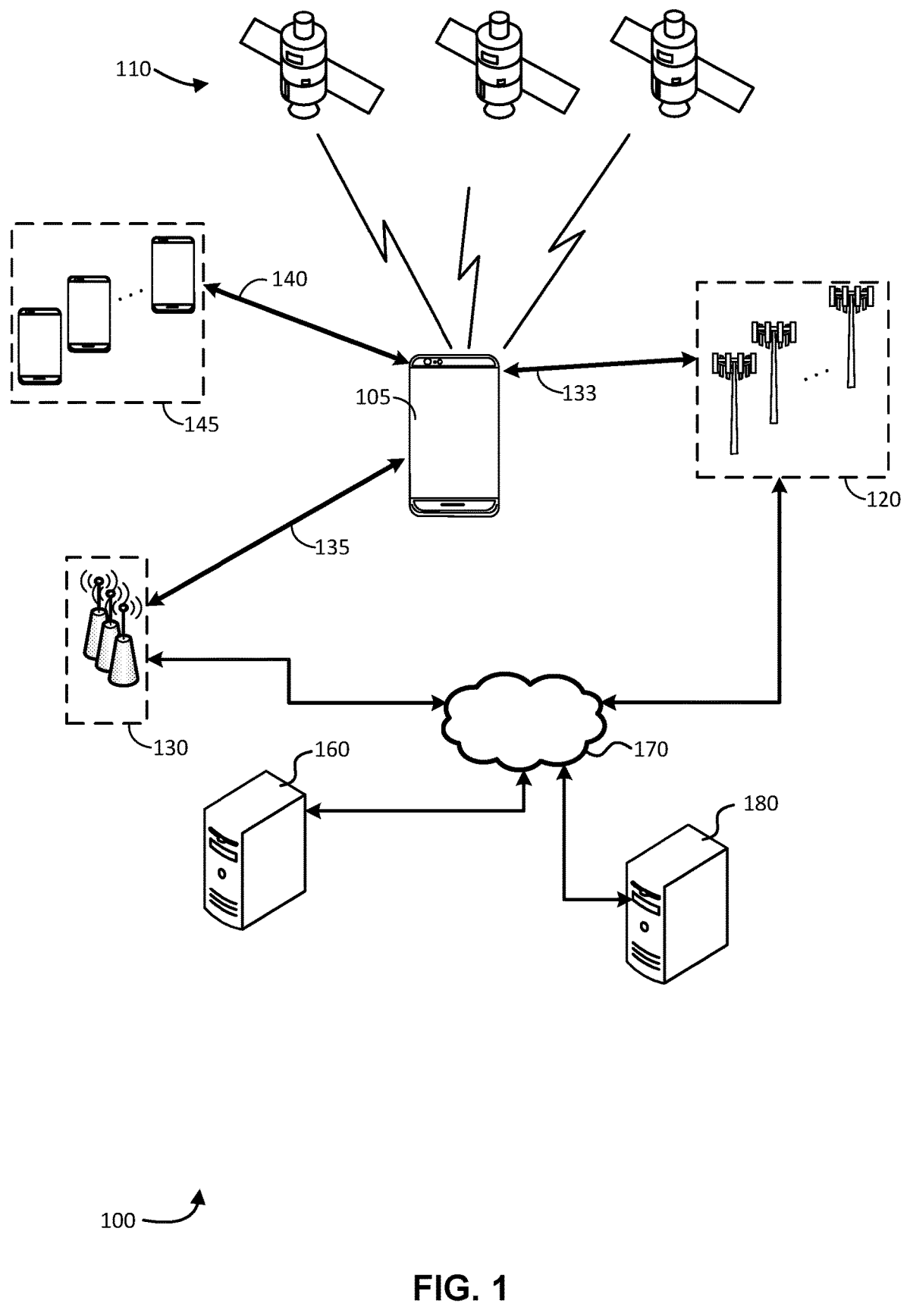

FIG. 1 is a simplified diagram of an example of a positioning system 100 according to certain embodiments. In positioning system 100, a UE 105, location server 160, and/or other components of positioning system 100 can use techniques provided herein for determining an estimated location of UE 105. The techniques described herein may be implemented by one or more components of positioning system 100. Positioning system 100 can include UE 105, one or more satellites 110 (also referred to as space vehicles (SVs)) for a Global Navigation Satellite System (GNSS) such as the Global Positioning System (GPS), base stations 120, access points (APs) 130, a location server 160, a network 170, and an external client 180. In general, positioning system 100 can estimate a location of UE 105 based on RF signals received by and/or sent from UE 105 and known locations of other components (e.g., GNSS satellites 110, base stations 120, or APs 130) transmitting and/or receiving the RF signals. Additional details regarding particular location estimation techniques are discussed in more detail below with regard to, for example, FIG. 2.

FIG. 1 provides a generalized illustration of various components, any or all of which may be utilized as appropriate, and each of which may be duplicated as needed. Specifically, although only one UE 105 is illustrated, it will be understood that many UEs (e.g., hundreds, thousands, millions, etc.) may utilize positioning system 100. Similarly, positioning system 100 may include a larger or smaller number of base stations 120 and/or APs 130 than illustrated in FIG. 1. The illustrated connections that connect the various components in positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, external client 180 may be directly connected to location server 160. A person of ordinary skill in the art will recognize many modifications to the components illustrated.

Depending on the desired functionality, network 170 may include any of a variety of wireless and/or wireline networks. Network 170 can include, for example, any combination of public and/or private networks, local and/or wide-area networks, and the like. Furthermore, network 170 may utilize one or more wired and/or wireless communication technologies. In some embodiments, network 170 may include, for example, a cellular or other mobile network, a wireless local area network (WLAN), a wireless wide-area network (WWAN), and/or the Internet. Examples of network 170 include an LTE wireless network, 5G NR wireless network, a Wi-Fi WLAN, and the Internet. LTE, 5G and NR are wireless technologies defined, or being defined, by the 3rd Generation Partnership Project (3GPP). As used herein, the terms "5G NR," "5G," and "NR" are used interchangeably to refer to these wireless technologies. Network 170 may also include more than one network and/or more than one type of network.

Base stations 120 and access points (APs) 130 may be communicatively coupled to network 170. In some embodiments, base station 120s may be owned, maintained, and/or operated by a cellular network provider, and may employ any of a variety of wireless technologies, as described herein below. Depending on the technology of network 170, base station 120 may include a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5G CN) in the case that Network 170 is a 5G network. An AP 130 may include, for example, a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing network 170 via base station 120 using a first communication link 133. Additionally or alternatively, because APs 130 may also be communicatively coupled with network 170, UE 105 may communicate with network-connected and Internet-connected devices, including location server 160, using a second communication link 135, or via one or more other UEs 145.

A "cell" may generically refer to a logical communication entity used for communication with a base station 120 (e.g., over some frequency resource referred to as a carrier frequency, component carrier (aggregated carrier with an increased bandwidth of, for example, 1.4, 3, 5, 10, 15, 20 MHz or higher), carrier, band, or the like), and may be associated with an identifier (e.g., a Physical Cell Identifier (PCID), a Virtual Cell Identifier (VCID), or a cell global identifier (CGID)) for distinguishing neighboring cells operating via the same or a different carrier frequency. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Location server 160 may comprise a server and/or another computing device configured to determine an estimated location of UE 105 and/or provide data (e.g., "assistance data") to UE 105 to facilitate location measurement and/or location determination by UE 105. According to some embodiments, location server 160 may include a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, location server 160 may include a Discovered SLP (D-SLP) or an Emergency SLP (E-SLP). Location server 160 may alternatively include an Enhanced Serving Mobile Location Center (E-SMLC) that supports location of UE 105 using a control plane (CP) location solution for LTE radio access by UE 105. Location server 160 may further include a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In the UP location solution, signaling to control and manage the location of UE 105 may be exchanged between location server 160 and UE 105 as data (e.g., data transported using the Internet Protocol (IP) and/or Transmission Control Protocol (TCP)) from the perspective of network 170.

As described above (and discussed in more detail below), the estimated location of UE 105 may be based on measurements of RF signals sent from and/or received by the UE 105. In particular, these measurements can provide information regarding the relative distance and/or angle of UE 105 from one or more components in positioning system 100 (e.g., GNSS satellites 110, APs 130, and base stations 120). The location of UE 105 can be estimated geometrically (e.g., using multiangulation and/or multilateration techniques) based on the distance and/or angle measurements, along with the known position of the one or more components.

Although terrestrial components such as APs 130 and base stations 120 may be fixed, embodiments are not so limited. In some embodiments, mobile components may be used. For example, in some embodiments, a location of UE 105 may be estimated at least in part based on measurements of RF 140 signals communicated between UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications, such as to assist direction finding or navigation for a user of UE 105 or to assist another user (e.g., associated with external client 180) to locate UE 105. A "location" is also referred to herein as a "location estimate", "estimated location", "location", "position", "position estimate", "position fix", "estimated position", "location fix", or "fix". The process of determining a location may be referred to as "positioning," "position determination," "location determination," or the like. A location of UE 105 may include an absolute location of UE 105 (e.g., a latitude and longitude and possibly altitude) or a relative location of UE 105 (e.g., a location expressed as distances north or south, east or west and possibly above or below some other known fixed location (including, e.g., the location of a base station 120 or AP 130) or some other locations such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., a 95% confidence level).

External client 180 may be a web server or remote application that may have some association with UE 105 (e.g., may be accessed by a user of UE 105), or may be a server, application, or computer system providing a location service to some other users, which may include obtaining and providing the location of UE 105 (e.g., to enable a service such as friend or relative finder, asset tracking or child or pet location). Additionally or alternatively, external client 180 may obtain and provide the location of UE 105 to an emergency service provider, government agency, and the like.

As previously noted, positioning system 100 can be implemented using a wireless communication network, such as an LTE-based or 5G NR-based network. FIG. 2 shows a diagram of a 5G NR positioning system 200, which may be an embodiment of a positioning system (e.g., positioning system 100) implementing 5G NR. 5G NR positioning system 200 may be configured to determine the location of a UE 105 using access nodes 210, 214, 216 (which may correspond with base stations 120 and access points 130 of FIG. 1), and, optionally, an LMF 220 (which may correspond with location server 160) to implement one or more positioning methods. In the illustrated example, 5G NR positioning system 200 may include UE 105 and components of 5G NR network, such as a Next Generation (NG) Radio Access Network (RAN) (NG-RAN) 235 and a 5G Core Network (CN) 240. A 5G network may also be referred to as an NR network. NG-RAN 235 may be referred to as a 5G RAN or as an NR RAN. 5G CN 240 may be referred to as an NG Core network. 5G NR positioning system 200 may further utilize information from GNSS satellites 110 from a GNSS system such as Global Positioning System (GPS) or a similar system (e.g. GLONASS, Galileo, Beidou, Indian Regional Navigational Satellite System (IRNSS)). Examples of components of 5G NR positioning system 200 are described below. 5G NR positioning system 200 may include additional or alternative components that may not be described in FIG. 2.

It is noted that FIG. 2 only provides a generalized illustration of various components, any or all of which may be utilized as appropriate, and each of which may be duplicated or omitted as desired. Specifically, although only one UE 105 is illustrated, it will be understood that many UEs (e.g., hundreds, thousands, millions, etc.) may utilize 5G NR positioning system 200. Similarly, 5G NR positioning system 200 may include a larger (or smaller) number of GNSS satellites 110, gNBs 210, ng-eNBs 214, Wireless Local Area Networks (WLANs) 216, Access and mobility Management Functions (AMFs) 215, external clients 230, and/or other components. The illustrated connections that connect the various components in 5G NR positioning system 200 include data and signaling connections which may include additional (or intermediary) components, direct or indirect physical and/or wireless connections, and/or additional networks. Furthermore, components may be rearranged, combined, separated, substituted, and/or omitted, depending on desired functionality.

In 5G NR networks, the frequency spectrum in which wireless nodes (e.g., base stations or UEs) operate is divided into multiple frequency ranges, including FR 1 (e.g., from 450 to 6000 MHz), FR 2 (e.g., from 24250 to 52600 MHz), FR 3 (above 52600 MHz), and FR 4 (between FR 1 and FR 2). In a multi-carrier system, such as a 5G network, one of the carrier frequencies is referred to as the "primary carrier,"

"anchor carrier," "primary serving cell," or "PCell," and the remaining carrier frequencies may be referred to as "secondary carriers," "secondary serving cells," or "SCells." In carrier aggregation, the anchor carrier may be the carrier operating on the primary frequency (e.g., FR 1) utilized by a UE and the cell in which the UE either performs the initial Radio Resource Control (RRC) connection establishment procedure or initiates the RRC connection re-establishment procedure. The primary carrier carries all common and UE-specific control channels and may sometimes be a carrier in a licensed frequency. A secondary carrier is a carrier operating on a second frequency (e.g., FR 2) that may be configured once the RRC connection is established between the UE and the anchor carrier and that may be used to provide additional radio resources. In some cases, the secondary carrier may be a carrier in an unlicensed frequency. The secondary carrier may contain only necessary signaling information and signals. The network may be able to change the primary carrier of any UE at any time. This may be done, for example, to balance the load on different carriers. Because a "serving cell" (whether a PCell or an SCell) corresponds to a carrier frequency or component carrier over which some base stations are communicating, the term "cell," "serving cell," "component carrier," "carrier frequency," and the like can be used interchangeably.

In order to be able to carry the data across a 5G radio access network, the data and information may be organized into a number of data channels. By organizing the data into various channels, a 5G communication system is able to manage the data transfers in an orderly fashion and the system is able to understand what data is arriving and hence is able to process it in a desired fashion. In order to group the data to be sent over the 5G NR radio access network, the data may be organized in a logical way. Because there are many different functions for the data being sent over the radio communications link, several different forms of data channel are used. The higher level channels are "mapped" or contained within others until finally at the physical level, where the channel contains data from higher level channels. The use of these 5G channels provide a method for organizing the data flow over the radio interface of the 5G communications network.

In 5G NR, an antenna port is defined such that the channel over which a symbol on the antenna port is conveyed can be inferred from the channel over which another symbol on the same antenna port is conveyed. The antenna port is logical concept related to physical layer (L1), rather than a physical concept (e.g., a physical antenna). Each antenna port represents a specific channel model and may carry its own resource grid and a specific set of reference signal in the grid. Each individual downlink transmission may be carried out from a specific antenna port, the identity of which is known to the UE, and the UE can assume that two transmitted signals experience the same radio channel if and only if they are transmitted from the same antenna port. In other words, the channel properties for resource elements (RE) of the reference signal are assumed to be same as (or very close to) the resource elements for other data (e.g., REs for Physical Downlink Shared Channel (PDSCH)). Therefore, data can be demodulated using the channel information obtained by the analysis of the reference channel. In practical, each antenna port, at least for the downlink transmission, can be stated as corresponding to a specific reference signal. The reference signal can be used by the UE to derive channel-state information related to the antenna port. The UE receiver can assume that this reference signal can be used to estimate the channel corresponding to specific antenna port. The supported set of antenna ports depends on the reference signal configuration in the cell. For example, for CRS signals, the set of antenna ports can include p=0, p∈{0,1}, or p∈{0,1,2,3}.

In 5G NR positioning system 200, UE 105 may include and/or may be referred to as a device, a mobile device, a wireless device, a mobile terminal, a terminal, a mobile station (MS), a Secure User Plane Location (SUPL)-Enabled Terminal (SET), or by another name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, UE 105 may support wireless communications using one or more RATs, such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), and the like. UE 105 may also support wireless communication using a WLAN 216 which (like the one or more RATs, and as previously noted with respect to FIG. 1) may connect to other networks, such as the Internet. The use of one or more of these RATs may allow UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

UE 105 may include a single entity or may include multiple entities, such as in a personal area network where a user may employ audio, video, and/or data I/O devices, and/or body sensors and a separate wireline or wireless modem. An estimate of a location of UE 105 may be referred to as a location, location estimate, location fix, fix, position, position estimate, or position fix, and may be geodetic, thus providing location coordinates for UE 105 (e.g., latitude and longitude), which may or may not include an altitude component (e.g., height above sea level, height above or depth below ground level, floor level or basement level). Alternatively, a location of UE 105 may be expressed as a civic location (e.g., as a postal address or the designation of some point or small area in a building such as a particular room or floor). A location of UE 105 may also be expressed as an area or volume (defined either geodetically or in civic form) within which UE 105 is expected to be located with some probability or confidence level (e.g., 67%, 95%, etc.). A location of UE 105 may further be a relative location comprising, for example, a distance and direction or relative X and Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude and altitude above or below the mean sea level).

Base stations in NG-RAN 235 shown in FIG. 2 may correspond to base stations 120 in FIG. 1 and may comprise a Transmission Reception Point (TRP). NG-RAN 235 may include next generation NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNB s 210). The communication interface between base stations (gNBs 210 and/or ng-eNB 214) may be referred to as an Xn interface 237. Access to the 5G network is provided to UE 105 via wireless communications between UE 105 and one or more of the gNBs 210, which may provide wireless communication access to 5G CN 240 on behalf of UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, serving gNB for UE 105 is assumed to be gNB 210-1, although other gNBs (e.g., gNB 210-2) may act as a serving gNB if UE 105 moves to another location or may act as a secondary gNB to provide additional throughput and bandwidth to UE 105.

Base stations in NG-RAN 235 shown in FIG. 2 may alternatively or additionally include a next generation evolved Node B, also referred to as an ng-eNB 214. Ng-eNB 214 may be connected to one or more gNBs 210 in NG-RAN 235, directly or indirectly via other gNBs 210 and/or other ng-eNBs. Ng-eNB 214 may provide LTE wireless access and/or evolved LTE (eLTE) wireless access to UE 105. Some gNBs 210 (e.g., gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216, which may connect to a Non-3GPP InterWorking Function (N3IWF) 250 in 5G CN 240 (e.g., in the case of an untrusted WLAN 216). For example, WLAN 216 may support IEEE 802.11 Wi-Fi access for UE 105 and may comprise one or more Wi-Fi APs (e.g., APs 130 of FIG. 1). In the illustrated example, N3IWF 250 may connect to other elements in 5G CN 240 such as AMF 215. In some embodiments, WLAN 216 may support another RAT such as Bluetooth. N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g., AMF 215) and not via N3IWF 250. For example, direct connection of WLAN 216 to 5GCN 240 may occur if WLAN 216 is a trusted WLAN for 5G CN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE's location) may be performed at the UE 105 (e.g., by measuring PRS signals transmitted by wireless nodes such as TRPS (e.g., gNBs 210, ng-eNB 214 and/or WLAN 216) and/or other UEs), and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNB s 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), reference signal time difference (RSTD), Round Trip signal propagation Time (RTT), Reference Signal Received Power (RSRP), Reference Signal Received Quality (RSRQ), Time of Arrival (TOA), AoA, Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

As described above, in some embodiments, a physical transmission point (e.g., base station) may include an array of antennas for beamforming. Transmit beamforming is a technique for focusing an RF signal in a specific direction. Traditionally, when a network node (e.g., a base station)

broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated such that they may appear to a receiver (e.g., a UE) as having the same parameters, regardless of whether or not the transmitting antennas of the network node are physically collocated. The radio channel parameters or properties that may be common across the antenna ports include Doppler spread/shift, average delay, delay spread, average gain, spatial receiver parameters, and the like. Doppler shift is a shift in the frequency of the radio signal relative to motion of the receiver. Doppler Spread is also referred to as the fading rate, which indicates difference between the signal frequency at the transmitter and receiver as a function of time (e.g., the rate at which the frequency changes over time). When a signal is transmitted from one or more antennas, it may reach a receiver through multiple paths due to reflection from surrounding clutter. The average time for the receiver to receive the multi-path components of the signal is the Average Delay. The difference between the time of arrival of the earliest significant multi-path component (e.g., the line of sight (LOS) component) and the time of arrival of the last significant multi-path component is the Delay spread. Spatial Receiver Parameter refers to beam forming properties of downlink received signal, such as dominant Angle of Arrival and average Angle of Arrival at the receiver.

In NR, there may be four types of quasi-collocation (QCL) relations. A QCL relation of a given type indicates that certain parameters regarding a second (target) reference RF signal on a second (target) beam can be derived from information about a source reference RF signal on a source beam. More specifically, if the source reference RF signal is QCL Type A, the receiver may use the source reference RF signal to estimate the Doppler shift, Doppler spread, average delay, and delay spread of a second (target) reference RF signal transmitted on the same channel. If the source reference RF signal is QCL Type B, the receiver may use the source reference RF signal to estimate the Doppler shift and Doppler spread of a second reference RF signal transmitted on the same channel. If the source reference RF signal is QCL Type C, the receiver may use the source reference RF signal to estimate the Doppler shift and the average delay of a second reference RF signal transmitted on the same channel. If the source reference RF signal is QCL Type D, the receiver may use the source reference RF signal to estimate the spatial receive parameter of a second reference RF signal transmitted on the same channel.

In receive beamforming, the receiver may amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain in other directions, or the beam gain in that direction is the highest among receive beams available to the receiver. This may result in a stronger received signal strength (e.g., RSRP, reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., PRS, navigation reference signals (NRS), TRS, phase tracking reference signal (PTRS), CRS, CSI-RS, primary synchronization signals (PSS), secondary synchronization signals (SSS), SSBs, etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

A downlink beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an uplink beam may be either a transmit beam or a receive beam, depending on the entity forming it. For example, if a base station is forming the uplink beam, it is an uplink receive beam, and if a UE is forming the uplink beam, it is an uplink transmit beam.

Positioning methods in wireless networks can use wireless signals of the wireless networks and thus may be dependent on the radio access technology (RAT), or can be independent of the RAT (e.g., using signals such as GPS signal). In a 5G NR positioning system (e.g., 5G NR positioning system 200), location measurements (e.g., AoA, AoD, TOA, RSTD) taken by the UE may use RF reference signals received from two or more base stations. For example, in DL-TDOA positioning, the UE may measure the RSTD, which represents the relative time difference between two TRPs with respect to the UE. In DL-TDOA, DL-AoD, or multi-RTT positioning, the UE may measure the RSRP, which represents the average received power of a single reference signal resource element. As described above, examples of the RF reference signals may include PRS that is defined for NR positioning to enable UEs to detect and measure using more neighboring TRPs. PRS can be used, for example, to perform the TDOA, AoD, and RTT-based positioning techniques. Compared with LTE CRS, PRS has a more regular structure and a larger bandwidth, which allows for a higher sampling rate and a more precise correlation and time of arrival (ToA) estimation. Other reference signals that can be used for positioning may include CRS, CSI-RS, synchronization signals, Radio Resource Management (RRM) signals, and the like. The reference signals may be transmitted in a Tx beam (e.g., using beamforming techniques), which may impact angular measurements, such as AoD. Table 1 below summarizes reference signals and measurements performed by UEs in some examples of RAT-dependent positioning techniques.

TABLE 1

Reference signals and Measurements for
examples of positioning techniques

| DL/UL Reference Signals | UE Measurements | Positioning techniques |
|---|---|---|
| DL-PRS | DL-RSTD | DL-TDOA |
| DL-PRS | DL-PRS RSRP | DL-TDOA, DL-AoD, Multi-RTT |
| DL-PRS/ SRS-for-positioning | UE Rx-Tx | Multi-RTT |
| SSB/CSI-RS for RRM | SS-RSRP (RSRP for RRM), SS-RSRQ (for RRM), CSI-RSRP (for RRM), CSI-RSRQ (for RRM) | E-CID |

Figures 3A, 3B, 3C:
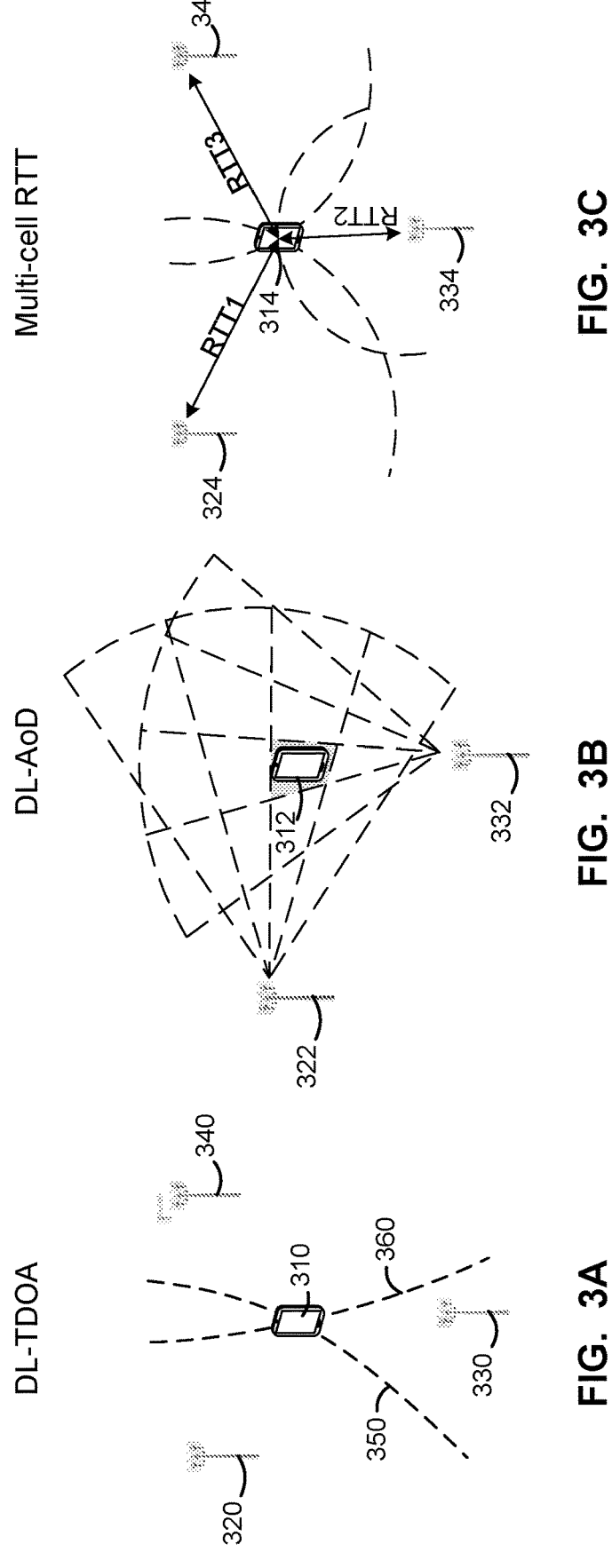
FIGS. 3A-3C illustrate different radio access technology-dependent NR positioning techniques.

FIGS. 3A-3C illustrate different RAT-dependent NR positioning technologies. NR native positioning technologies supported in 5G NR include downlink (DL)-only, uplink (UL)-only, and combined DL and UL positioning methods. For example, DL-based positioning techniques may include DL Time Difference of Arrival (DL-TDOA) or DL Angle of Departure (DL-AoD) technique. UL-based positioning techniques may include UL Time Difference of Arrival (UL-TDOA) or UL Angle of Arrival (UL-AoA) technique. Combined DL and UL positioning techniques may include Round-Trip Time (RTT) positioning techniques using multiple neighboring base stations, which may be referred to as multi-RTT positioning technique.

FIG. 3A illustrates an example of downlink-based positioning using the DL-TDOA technique. In the illustrated example, a UE 310 may receive downlink signals from three TRPs. Based on the difference in the arrival times of signals (TDOA) from two TRPs to UE 310, UE 310 may be determined to be on a hyperbola with one of the TRPs at the focal point of the hyperbola. For example, based on the difference in the arrival times of signals from two TRPs 320 and 330 to UE 310, UE 310 may determine that it is on a hyperbola 350 with TRP 330 at the focal point of hyperbola 350. Similarly, based on the difference in the arrival times of signals from two TRPs 340 and 330 to UE 310, UE 310 may determine that it is on a hyperbola 360 with TRP 340 at the focal point of hyperbola 360. Therefore, UE 310 may be at the intersection point of hyperbola 350 and hyperbola 360.

FIG. 3B illustrates an example of downlink-based positioning using the DL-AoD technique. In DL-AoD positioning, a TRP may transmit AoD information using an array of antennas. A UE may determine its own position based on the positions of multiple TRPs and the directions (angles) of the beams from the multiple TRPs. In the illustrated example, a UE 312 may receive signals from TRP 322 and TRP 332. Based on the locations of TRP 322 and TRP 332 and the directions of the beams from TRP 322 and TRP 332, UE 312 may determine that it is at the intersection point of a beam from TRP 322 and a beam from TRP 332.

FIG. 3C illustrates an example of downlink-based positioning using the RTT positioning technique. In the illustrated example, both uplink and downlink signals are used to determine the round-trip time (and thus a distance) from a UE 314 to a TRP 324, 334, or 344. Based on the round-trip time, UE 314 may be determined to be on a circle with the TRP at the center of the circle. Using the round-trip time between UE 314 and each of three or more TRPs, UE 314 may be determined to be at the intersection point of three or more circles.

Figure 4:
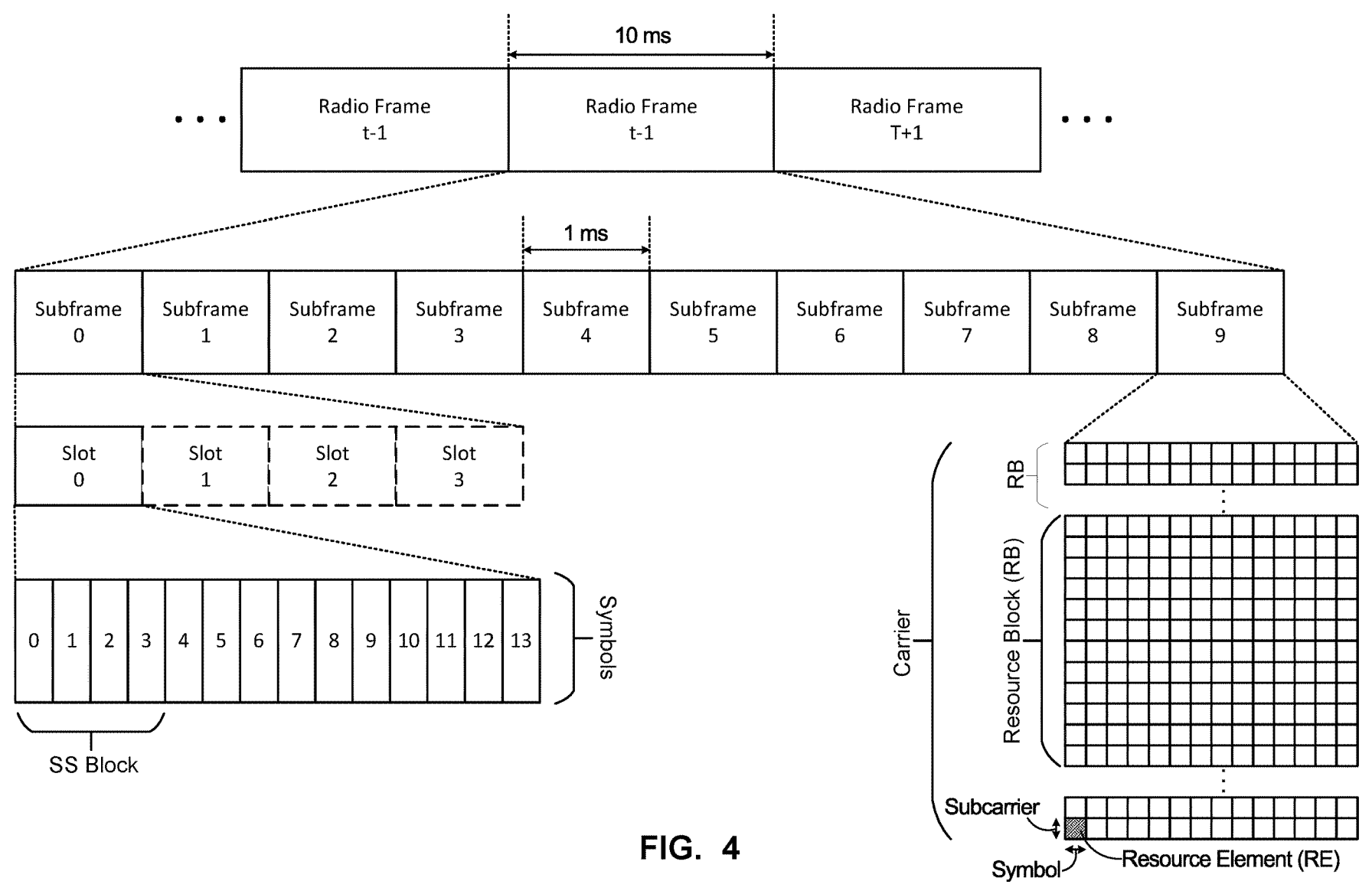

FIG. 4 is a diagram illustrating an example of a frame structure 400 for NR and associated terminology, which can serve as the basis for physical layer communication between UE 105 and the base stations, such as serving gNB 210-1. The transmission timeline for each of the downlink and uplink may be partitioned into units of radio frames (or simply frames). Each radio frame may have a predetermined duration (e.g., 10 ms) and may be partitioned into 10 subframes, each of 1 ms, with indices of 0 through 9. Each subframe may include a variable number (e.g., 1-4) of slots depending on the subcarrier spacing. Each slot may include multiple symbol periods (or simply symbols), such as 7 or 14 symbol periods, depending on the subcarrier spacing. The symbol periods in each slot may have assigned indices. A mini slot may comprise a sub slot structure (e.g., 2, 3, or 4 symbols).

A resource grid may be used to represent time slots and spectrum, each time slot including one or more time-concurrent resource blocks (RBs) (also referred to as physical RBs (PRBs)) in the frequency domain. Also shown in FIG. 4 is the complete Orthogonal Frequency-Division Multiplexing (OFDM) of a subframe, illustrating how a subframe can be divided into a plurality of Resource Blocks (RBs). A single RB can comprise, for example, a grid of Resource Elements (REs) spanning 14 symbols and 12 subcarriers. An RE may correspond to one symbol length in the time domain and one subcarrier in the frequency domain. Each symbol in a slot may be associated with a link direction (e.g., downlink (DL), uplink (UL), or flexible) of data transmission and the link direction for each subframe may be dynamically switched. The link directions may be based on the slot format. Each slot may include DL/UL data as well as DL/UL control information.

The system bandwidth may be divided into multiple (K) orthogonal subcarriers, which may also be referred to as tones, bins, and the like. Each subcarrier may be modulated with data. Modulated symbols may be sent in the frequency domain with, for example, OFDM, and in the time domain with, for example, single-carrier frequency division multiplexing (SC-FDM). The spacing between adjacent subcarriers may be fixed, and the total number of subcarriers K may depend on the system bandwidth. For example, the spacing of the subcarriers may be 15 kHz and the minimum resource allocation (resource block) may be 12 subcarriers (for a total bandwidth of 180 kHz per RB). The nominal FFT size may be equal to 128, 256, 512, 1024, or 2048 for system bandwidth of 1.25, 2.5, 5, 10, or 20 MHz, respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology defined by, for example, the subcarrier space, symbol length, and cyclic prefix (CP). In contrast, NR may support multiple numerologies ($\mu$), for example, subcarrier spacing of 15 kHz (the base subcarrier spacing), 30 kHz, 60 kHz, 120 kHz, 240 kHz, or greater may be available. Table 2 below lists some examples of parameters for different NR numerologies.

TABLE 2

Examples of parameters for different NR numerologies

| μ | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

Figure 5:
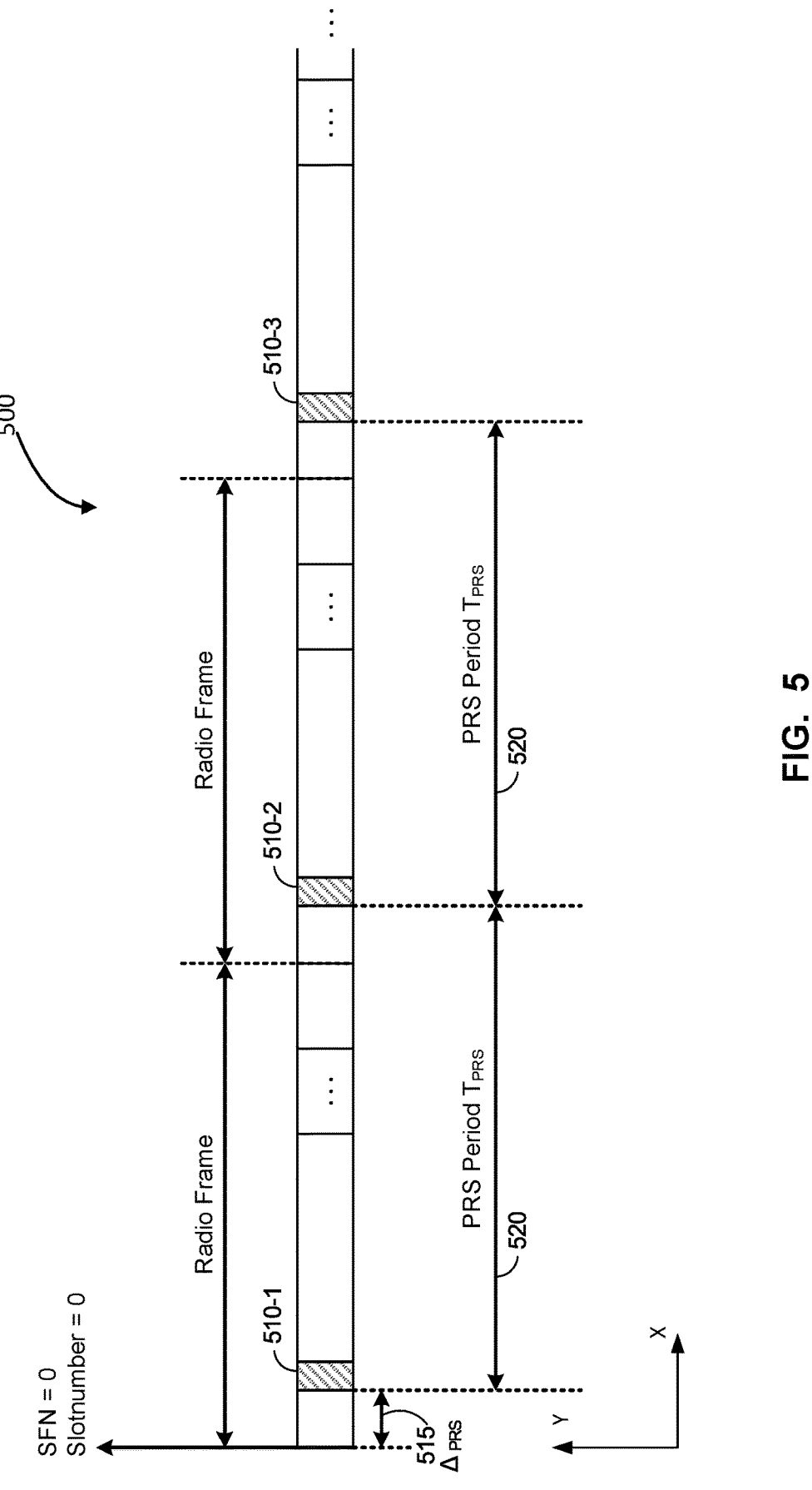
FIG. 5 illustrates an example of a radio frame sequence with PRS positioning occasions.

FIG. 5 is a diagram showing an example of a radio frame sequence 500 with NR PRS positioning occasions. A "PRS instance" or "PRS occasion" refers to one instance of a periodically repeated time window (e.g., a group of one or more consecutive slots) where PRS resources (explained in more detail below) are expected to be transmitted. A PRS instance or occasion may also be referred to as a "PRS positioning occasion," a "PRS positioning instance," a "positioning occasion," "a positioning instance," a "positioning repetition," or simply an "occasion," an "instance," or a "repetition." Radio frame sequence 500 may be applicable to the broadcast of downlink (DL) PRS from base stations 120 in positioning system 100. Radio frame sequence 500 may be used in 5G NR (e.g., in 5G NR positioning system 200) and/or in LTE. Similar to FIG. 4, time is represented horizontally (e.g., on an X axis) in FIG. 5, with time increasing from left to right. Frequency is represented vertically (e.g., on a Y axis) with frequency increasing (or decreasing) from bottom to top.

FIG. 5 shows how PRS positioning occasions 510-1, 510-2, and 510-3 (collectively and generically referred to herein as positioning occasions 510) are determined by a System Frame Number (SFN), a cell-specific subframe offset ($\Delta_{PRS}$) 515, and a PRS Periodicity ($T_{PRS}$) 520. The PRS subframe configuration may be defined by a "PRS Configuration Index," $I_{PRS}$, included in assistance data (e.g., OTDOA assistance data), which may be defined by governing 3GPP standards. Cell-specific subframe offset ($\Delta_{PRS}$) 515 may be defined in terms of the number of subframes transmitted starting from System Frame Number (SFN) 0 to the start of the first (subsequent) PRS positioning occasion.

A PRS may be transmitted by wireless nodes (e.g., base stations 120 or other UEs) after appropriate configuration (e.g., by an Operations and Maintenance (O&M) server). A PRS may be transmitted in special positioning subframes or slots that are grouped into positioning occasions 510. For example, a PRS positioning occasion 510-1 can comprise $N_{PRS}$ consecutive positioning subframes where the number $N_{PRS}$ may be between 1 and 160 (e.g., may include the values 1, 2, 4 and 6 as well as other values). PRS positioning occasions 510 may be grouped into one or more PRS occasion groups. As noted, PRS positioning occasions 510 may occur periodically at an interval $T_{PRS}$ (milliseconds or subframes), where $T_{PRS}$ may be 5, 10, 20, 40, 80, 160, 320, 640, or 1280 (or any other appropriate value). In some aspects, $T_{PRS}$ may be measured in terms of the number of subframes between the start of consecutive positioning occasions.

In some aspects, when a UE 105 receives a PRS configuration index $I_{PRS}$ in the assistance data for a particular cell (e.g., a base station), UE 105 may determine the PRS periodicity ($T_{PRS}$) 520 and cell-specific subframe offset ($\Delta_{PRS}$) 515 using stored index data. UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and may include assistance data for a reference cell and a number of neighbor cells supported by various wireless nodes.

With reference to the frame structure in FIG. 4, a collection of REs that are arranged in a particular time/frequency pattern and are used for the transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource may occupy consecutive RBs in the frequency domain. The transmission of a PRS resource within a given RB has a particular comb size (also referred to as the "comb density"). A comb size "N" (e.g., 2, 4, 6, or 12) represents the subcarrier spacing (or frequency/tone spacing) for each symbol of M (e.g., 4 or 12) symbols of a PRS resource configuration, where the configuration uses every Nth subcarrier for certain symbols of an RB. For example, in a pattern of comb-4 with 4 symbols, for each of the 4 continuous symbols of the PRS resource configuration, REs corresponding to every fourth subcarrier (e.g., subcarriers 0, 4, 8) are used to transmit the PRS signals.

A PRS resource may be transmitted in a resource block having a certain comb pattern. In one example, a DL-PRS resource may span, for example, 2, 4, 6, or 12 consecutive symbols within a slot with a fully frequency-domain staggered pattern. A DL-PRS resource can be configured in any higher layer configured downlink or flexible symbol of a slot. There may be a constant energy per resource element (EPRE) for all REs of a given DL-PRS resource. Table 3 shows the REs used to transmit DL-PRS resource in an RB having comb size 2, 4, 6, or 12 over 2, 4, 6, or 12 symbols, where { . . . } represents the subcarriers used for the REs or symbols. For example, a 6-symbol comb pattern {0, 3, 1, 4, 2, 5} indicates that the first symbol is transmitted using subcarrier 0, the second symbol is transmitted using subcarrier 3, the third symbol is transmitted using subcarrier 1, the fourth symbol is transmitted using subcarrier 4, the fifth symbol is transmitted using subcarrier 2, and the sixth symbol is transmitted using subcarrier 5.

TABLE 3

Examples of PRS comb patterns in a resource block

| Comb | 2 Symbols | 4 Symbols | 6 Symbols | 12 Symbols |
|---|---|---|---|---|
| 2 | {0, 1} | {0, 1, 0, 1} | {0, 1, 0, 1, 0, 1} | {0, 1, 0, 1, 0, 1, 0, 1, 0, 1, 0, 1} |
| 4 | NA | {0, 2, 1, 3} | NA | {0, 2, 1, 3, 0, 2, 1, 3, 0, 2, 1, 3} |

TABLE 3-continued

| | Examples of PRS comb patterns in a resource block | | | |
|---|---|---|---|---|
| Comb | 2 Symbols | 4 Symbols | 6 Symbols | 12 Symbols |
| 6 | NA | NA | {0, 3, 1, 4, 2, 5} | {0, 3, 1, 4, 2, 5, 0, 3, 1, 4, 2, 5} |
| 12 | NA | NA | NA | {0, 6, 3, 9, 1, 7, 4, 10, 2, 8, 5, 11} |

Figures 6A, 6B, 6C, 6D, 6E, 6F, 6G, 6H:
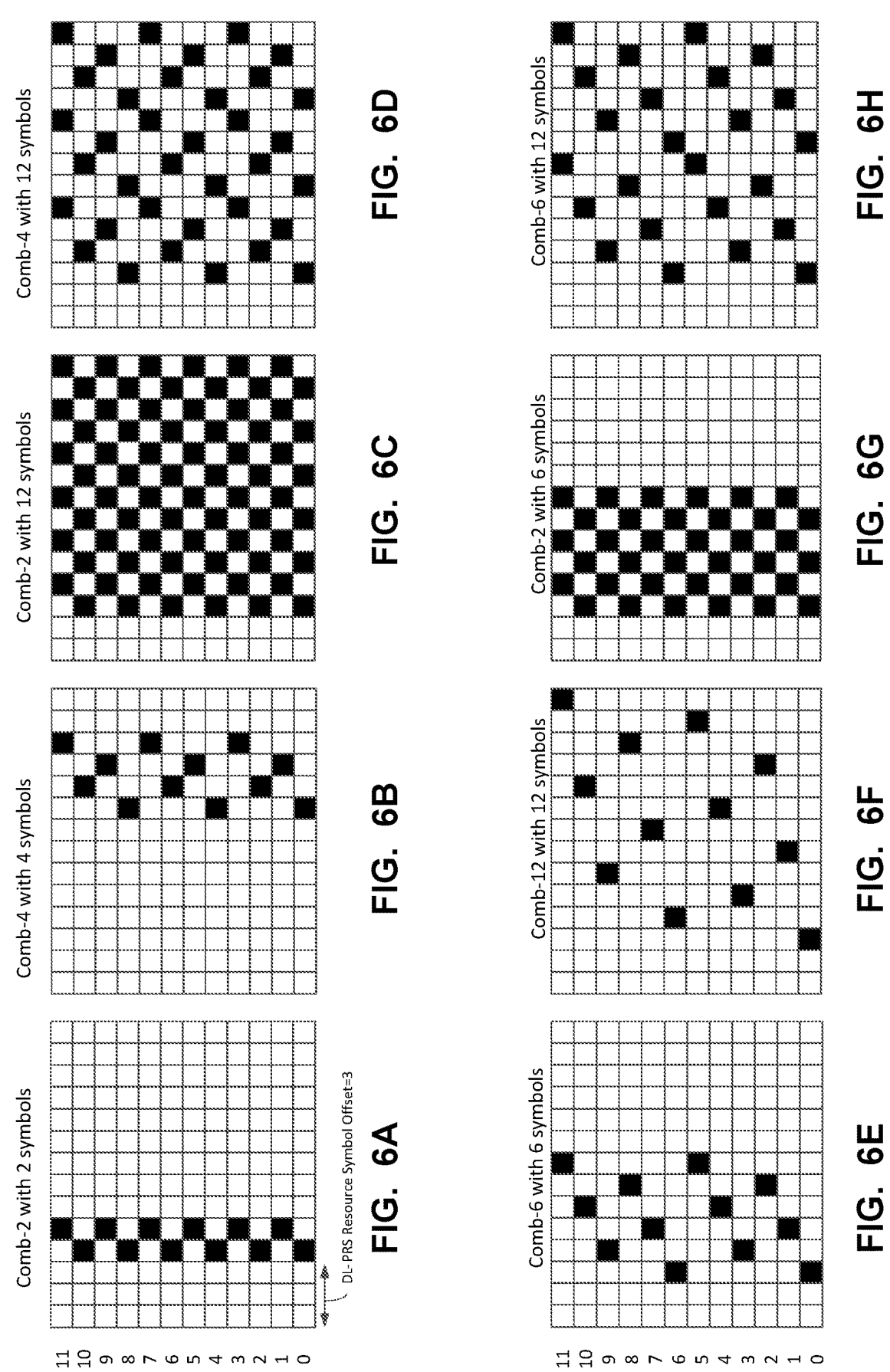
FIGS. 6A-6H illustrate examples of Positioning Reference Signal (PRS) comb patterns in a resource block.

FIGS. 6A-6H show examples of PRS comb patterns in a resource block. The illustrated comb patterns correspond to various comb patterns shown in Table 3 above. Specifically, FIG. 6A illustrates an example of a comb-2 PRS comb pattern with two symbols, where two continuous symbols (or symbol periods) have REs used for PRS signals and the REs for PRS occupy every other subcarrier in each symbol period. FIG. 6B illustrates an example of a comb-4 PRS comb pattern with four symbols, where four continuous symbols have REs for PRS signals and the REs for PRS occupy every fourth subcarrier in each symbol. FIG. 6C illustrates an example of a comb-2 PRS comb pattern with 12 symbols, where twelve continuous symbols have REs for PRS signals and the REs for PRS occupy every other subcarrier in each symbol. FIG. 6D illustrates an example of a comb-4 PRS comb pattern with 12 symbols, where 12 continuous symbols have REs for PRS signals and the REs for PRS occupy every fourth subcarrier in each symbol. FIG. 6E illustrates an example of a comb-6 PRS comb pattern with 6 symbols, where six continuous symbols have REs for PRS signals and the REs for PRS occupy every sixth subcarrier in each symbol. FIG. 6F illustrates an example of a comb-12 PRS comb pattern with 12 symbols, where 12 continuous symbols have REs for PRS signals and the REs for PRS occupy every 12th subcarrier in each symbol. FIG. 6G illustrates an example of a comb-2 PRS comb pattern with 6 symbols, where six continuous symbols have REs for PRS signals and the REs for PRS occupy every other subcarrier in each symbol. FIG. 6H illustrates an example of a comb-6 PRS comb pattern with 12 symbols, where 12 continuous symbols have REs for PRS signals and the REs for PRS occupy every sixth subcarrier in each symbol.

A "PRS resource set" is a group of PRS resources used for the transmission of PRS signals, where each PRS resource may have a PRS resource ID. In addition, the PRS resources in a PRS resource set may be associated with the same TRP. A PRS resource set is identified by a PRS resource set ID and is associated with a particular TRP (identified by a cell ID). In addition, the PRS resources in a PRS resource set may have the same periodicity, a common pattern configuration, and the same repetition factor across slots.

A PRS resource ID in a PRS resource set may be associated with a single beam (and/or beam ID) transmitted from a single TRP (where a TRP may transmit one or more beams). Thus, each PRS resource of a PRS resource set may be transmitted on a different beam, and as such, a PRS resource (or simply "resource") can also be referred to as a "beam." Different PRS resources of a PRS resource set may represent a "beam sweep" of a TRP.

In 5G NR positioning system 200 illustrated in FIG. 2, a TRP (e.g., 210, 214, 216) may transmit frames or other physical layer signaling sequences, supporting PRS signals (i.e., a DL PRS) according to frame configurations as previously described, which may be measured and used for position determination of UE 105. As noted, other types of wireless network nodes, including other UEs, may also be configured to transmit PRS signals configured in a manner similar to (or the same as) that described above. Because transmission of a PRS by a wireless network node may be directed to all UEs within a radio range, the wireless network node may be considered to transmit (or broadcast) a PRS.

Figure 7:
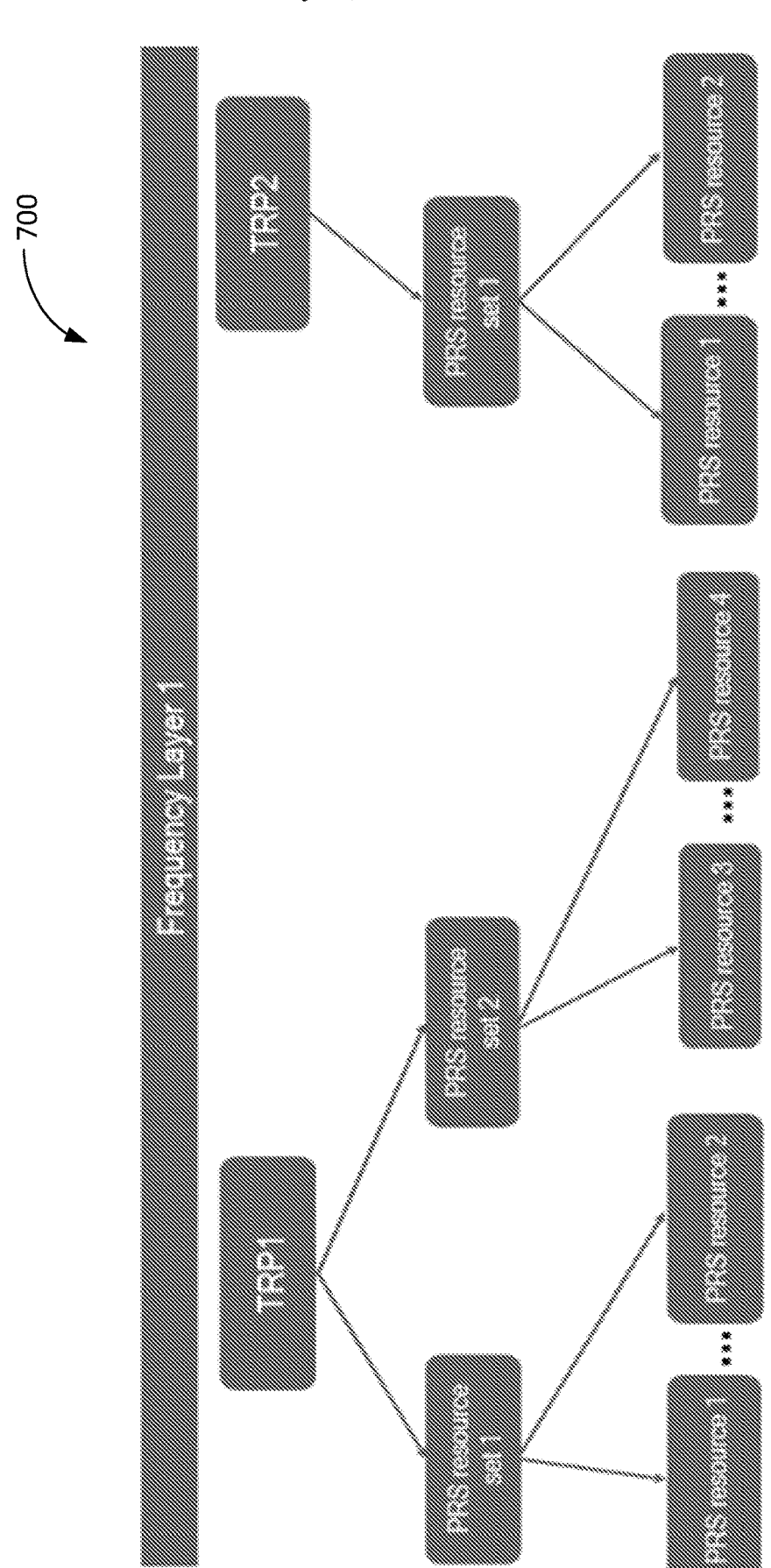
FIG. 7 includes a hierarchical structure illustrating PRS resources and PRS resource sets used by different Transmission Reception Points (TRPs) of a given Frequency Layer (FL).

FIG. 7 is a diagram of a hierarchical structure illustrating how PRS resources and PRS resource sets may be used by different TRPs of a given frequency layer (FL), as defined in 5G NR. A DL PRS positioning FL is a collection of DL PRS resource sets which have the same subcarrier spacing (SCS) and cyclic prefix (CP) type, the same value of DL PRS bandwidth, the same center frequency, and the same comb size. In one example, a UE 105 may be configured with up to four DL PRS positioning FLs. A UE 105 can be configured with one or more DL PRS resource sets from each of one or more TRPs. Each DL PRS resource set includes K≥1 DL PRS resource(s), which may each correspond to a Tx beam of the TRP.

NR has multiple frequency bands across different frequency ranges (e.g., Frequency Range 1 (FR1) and Frequency Range 2 (FR2)). FLs may be on the same band or different bands. Additionally, as illustrated in FIG. 7, multiple TRPs (e.g., TRP1 and TRP2) may be on the same FL. Each TRP can have, for example, up to two PRS resource sets, each with one or more PRS resources, as described above.

Different PRS resource sets may have different periodicity. For example, one PRS resource set may be used for tracking, while another PRS resource set could be used for acquisition. Additionally or alternatively, one PRS resource set may have more beams, while another PRS resource set may have fewer beams. Accordingly, different resource sets may be used by a wireless network for different purposes. Examples of repetition and beam sweeping options for PRS resource sets are described below.

Figure 8:
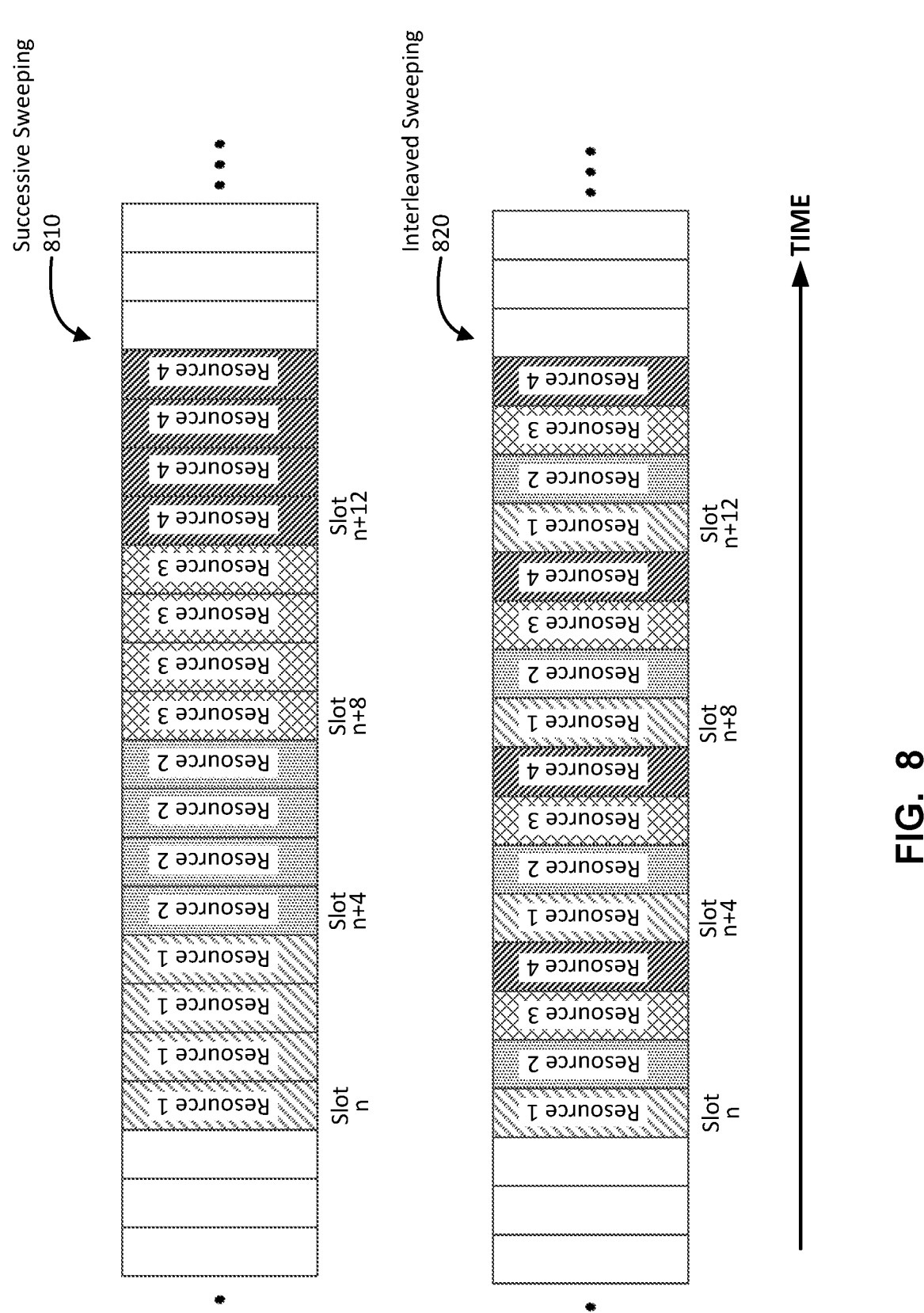
FIG. 8 is a time diagram illustrating two different options for slot usage of a resource set according to certain embodiments.

FIG. 8 is a diagram illustrating two different options of slot usage for a resource set according to an embodiment. Because each example repeats each resource four times, the resource set is said to have a repetition factor of four. Successive sweeping 810 comprises repeating a single resource (resource 1, resource 2, etc.) four times before proceeding to a subsequent resource. In this example, if each resource corresponds to a different beam of a TRP, the TRP repeats a beam for four slots in a row before moving to the next beam. Because each resource is repeated in successive slots (e.g., resource 1 is repeated in slots n, n+1, n+2, etc.), the time gap for a resource is one slot. For interleaved sweeping 820, the TRP may move from one beam to the next for each subsequent slot, rotating through four beams for four rounds. Because each resource is repeated every four slots (e.g., resource 1 is repeated in slots n, n+4, n+8, etc.), the time gap is four slots. It is noted that embodiments are not so limited. Resource sets may comprise a different number of resources, repetitions, and repetition patterns. Moreover, as noted above, each TRP may have multiple resource sets, multiple TRPs may utilize a single FL, and a UE may be capable of taking measurements of PRS resources transmitted via multiple (e.g., 1 to 4) FLs.

To obtain PRS measurements from PRS signals sent by TRPs and/or UEs in a network, a UE can be configured to observe PRS resources during a period of time referred to as a measurement period. That is, to determine a position of the UE using PRS signals, a UE and a location server (e.g., LMF 220 of FIG. 2) may initiate a location session in which the UE is given a period of time to observe PRS resources and report resulting PRS measurements to the location server.

Despite the rapid development of 5G technologies, much of the wireless signal traffic may still be carried by LTE networks until 5G device penetration exceeds that of LTE. In previous generations, it took years to re-farm from 2G to 3G and from 2G/3G to 4G. From 4G to 5G, 'soft' and flexible re-farming through "Spectrum Sharing" techniques may be used to provide a coexistence between 5G and 4G. Spectrum sharing can be implemented in a static or dynamic manner. In static spectrum sharing, there may be dedicated carriers for each technology within the same band, even if certain carriers are not being used by the corresponding technology. Therefore, the spectrum efficiency may not be as high as desired. For example, LTE-only users, currently being the majority, may suffer diminished throughput, even though some carriers assigned to 5G technology are not used by 5G users.

Dynamic Spectrum Sharing (DSS) is based on the flexible design of NR physical layer, where NR signals can be transmitted over unused LTE resources. With LTE, all channels are statically assigned in the time-frequency domain, whereas the NR physical layer is flexible for reference signals, data, and control channels. For example, there can be different subcarrier spacing (SCS) for data channels and synchronization channels in NR, based on the band assigned. In contrast, LTE may need very tight coordination between gNB and eNB in order to provide reliable synchronization in radio scheduling for DSS. The flexibility of the NR physical layer allows dynamic configurations that can minimize a chance of collision between the two technologies. Therefore, the physical layer of NR may be designed to fit around that of LTE to deploy DSS on a shared spectrum. DSS techniques allow operators to dynamically adjust the amount of spectrum available to each technology based on user needs that can be assessed in real time and can be rapidly changing. Thus, DDS techniques can support LTE and 5G NR in the same band to make more efficient use of the finite spectrum resource and to achieve broad coverage with 5G services in existing low-band or mid-band spectrum. One feature of DSS is that only 5G users may be made aware of the spectrum sharing, while the functionalities of the existing LTE devices can remain unaffected.

As such, in DSS, NR signals may be scheduled in the LTE subframes while ensuring no respective impact on LTE users in terms of certain essential channels, such as the reference signals used for synchronization and downlink measurements. For example, DSS options can generally be designed around the LTE CRS signals that are used to determine the phase reference for coherent demodulation of the downlink data because LTE CRS signals have a fixed time-frequency resource assignment and are transmitted in every slot. Due to the CRS signals' intended purpose of channel estimation, the bandwidth of the LTE CRS signals is generally the transmission bandwidth of the respective cell or component carrier. NR PRS has a more regular structure and can have a larger bandwidth (e.g., spanning across multiple component carriers), which may allow for more precise correlation and TOA estimation.

Figure 9:
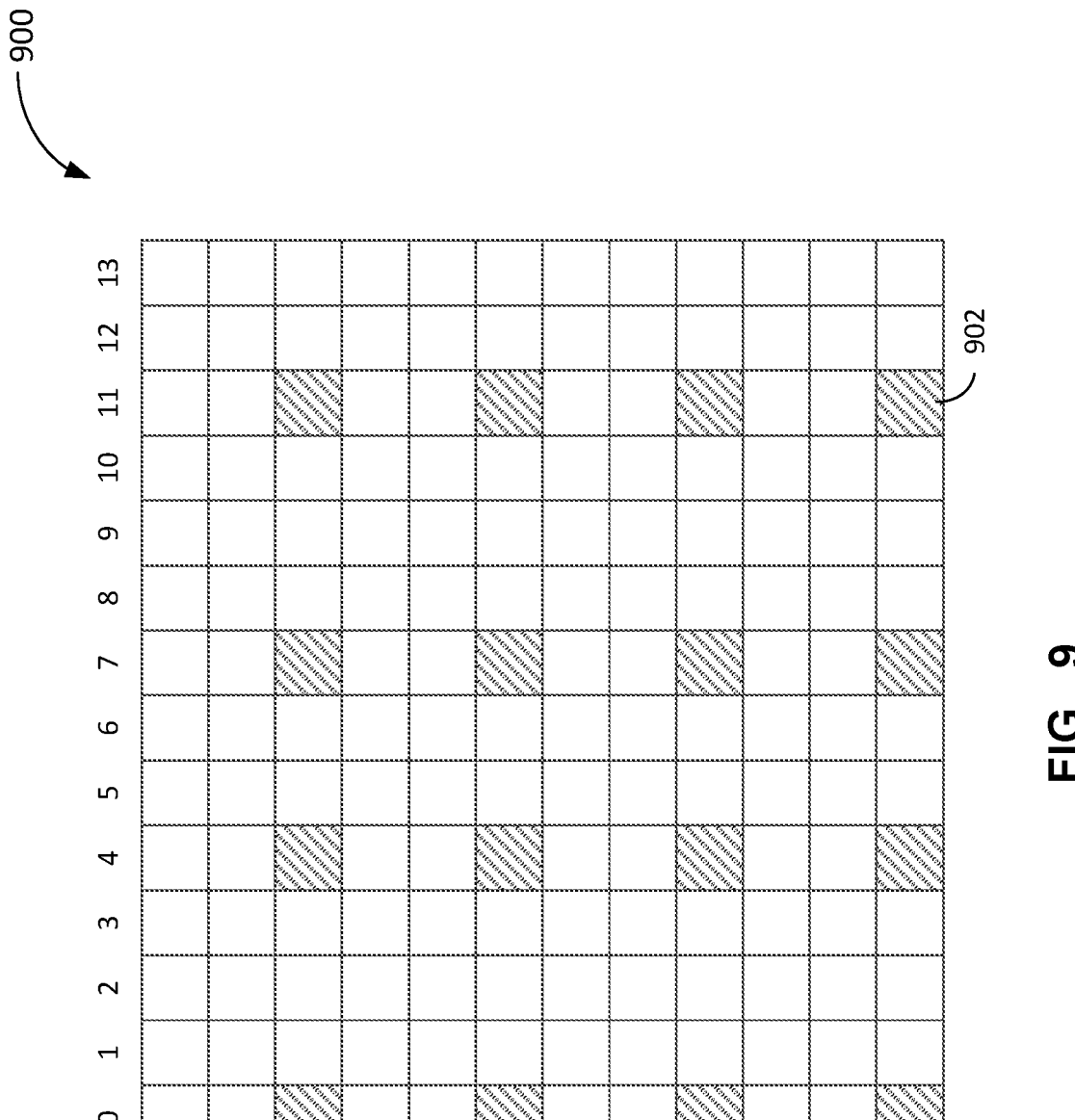
FIG. 9 illustrates an example of a resource block including resource elements for LTE Cell-specific Reference Signals (CRS).

FIG. 9 illustrate an example of a resource block 900 including resource elements 902 used for LTE CRS signals. Resource block 900 may include 13 symbols in each of 12 subcarriers, and thus 156 total resource elements. In the illustrated example, resource elements 902 for LTE CRS signals occupy symbols 0, 4, 7, and 11 in the time domain and occupy every third subcarrier (e.g., subcarrier 0, 3, 6, and 9) in the frequency domain. Thus, REs 902 for LTE CRS are arranged in a comb-3 pattern with 4 repetitions, where the repetitions are not on continuous symbols. The pattern may be the same for every resource block 900. Thus, each RB 900 may include 16 REs for LTE CRS. Other REs in RB 900 may be used, for example, for LTE data, 5G reference signals, or 5G data. Instead of CRS signals, 5G NR uses demodulation reference signals (DMRS), which are only transmitted together with 5G data and thus can minimize the impact on LTE capacity.

Figure 10:
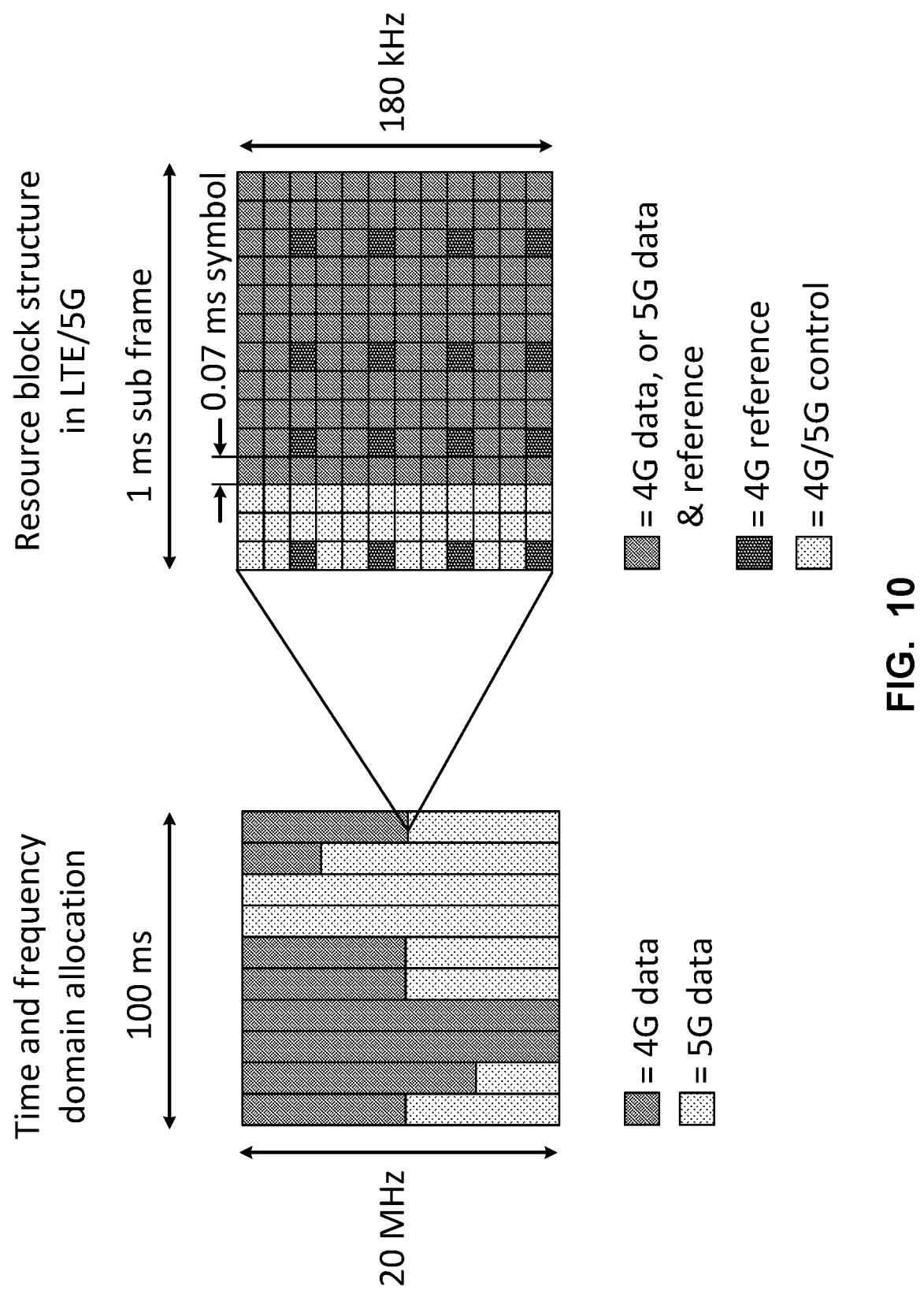
FIG. 10 illustrates an example of resource sharing between Long-Term Evolution (LTE) and 5G using dynamic spectrum sharing.

FIG. 10 illustrates an example of LTE and 5G NR resource sharing using dynamic spectrum sharing. As described above, in LTE and 5G, the radio resource may be allocated in time and frequency domains into frames, subframes, slots, and resource blocks, where REs for LTE CRS are arranged in a comb-3 pattern with 4 repetitions at symbols 0, 4, 7, and 11 in each resource block. 5G references and data may be fit around these REs for LTE CRS (referred to as CRS rate matching) due to the flexibility of 5G physical layer. For example, resource that is not currently used by the 4G LTE service may be reallocated to 5G references and data as long as the reallocation does not collide with the LTE reference signals, such as the LTE CRS signals that may be present in every resource block. In this way, existing LTE carrier may operate 5G NR and LTE simultaneously to provide 5G NR and LTE service in the same frequency band at the same time to fully utilized the spectrum and other radio resource.

In the example shown in FIG. 10, the first three symbols of a resource block may be used for LTR and 5G control, such as LTE CRS, LTE Physical Downlink Control Channel (PDCCH), and 5G PDCCH. For example, LTE control signals, such as LTE PDCCH, may occupy the first two symbols. In 5G NR, the PDCCH is confined to a single control resource set (CORESET) (e.g., the third symbol) and is transmitted with its own DMRS (e.g., the fourth symbol). PDCCH carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one symbol in the time domain. LTE data, 5G references, and 5G data may be allocated to other REs that are not used by LTE CRS using rate matching techniques as described in detail below to avoid collision between LTE signals and 5G signals. In this way, the LTE overhead for spectrum sharing may be reduced.

Figures 11A, 11B, 11C:
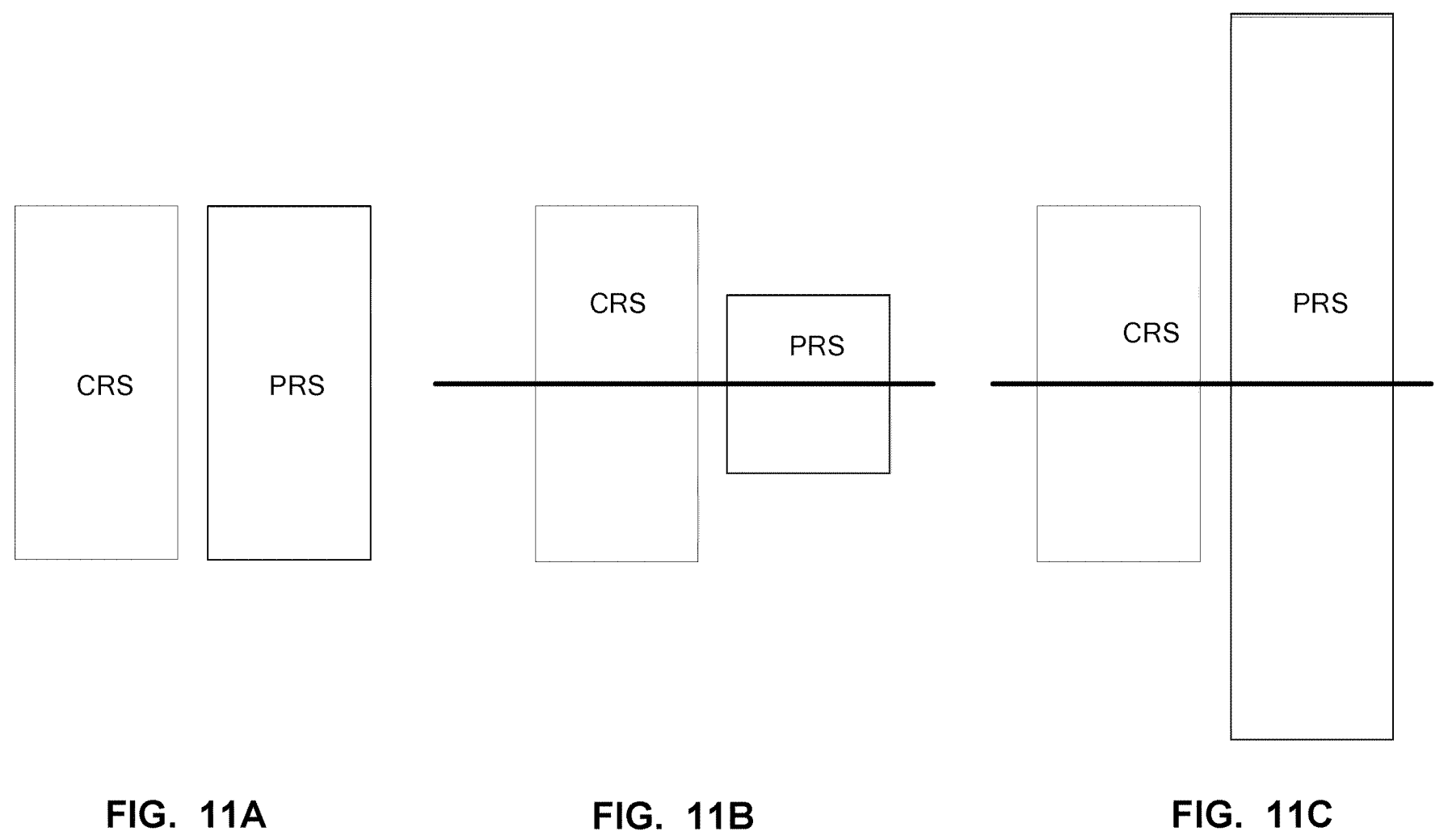

FIGS. 11A-11C are graphs that illustrate examples of frequency bands of LTE CRS and NR PRS signals that may be associated in dynamic spectrum sharing, where, similar to FIG. 10, frequency bandwidth is represented vertically. 5G reference signals (e.g., PRS) may be fit around LTE CRS when the LTE CRS and 5G reference signals (e.g., PRS) have the same bandwidth or have the same center frequency. As described above, LTE CRS may use a bandwidth of a component carrier (e.g., a cell). The bandwidth of NR PRS can be flexible, such as lower or higher than the bandwidth of the LTE CRS signals. FIG. 11A shows that the LTE CRS signal and the NR PRS signal that are associated in a component carrier have the same bandwidth. FIG. 11B shows that the LTE CRS signal and the NR PRS signal that are associated in a component carrier have different bandwidths, where the NR PRS may occupy a lower bandwidth than the LTE CRS. But the LTE CRS signal and the NR PRS signal have the same central frequency, such that a same antenna may be tuned to receive both the LTE CRS signal and the NR PRS signal. FIG. 11C shows that the LTE CRS signal and the NR PRS signal that are associated have different bandwidths, where the NR PRS may occupy a higher bandwidth than LTE CRS. For example, the NR PRS may span across multiple component carriers. But the LTE CRS signal and the NR PRS signal may have the same central frequency, such that a same antenna may be tuned to receive both the LTE CRS signal and the NR PRS signal.

FIGS. 12A-12D illustrate examples of NR PRS structures for associating with LTE CRS signals in a resource block. The NR PRS structures illustrated in FIGS. 12A-12D have various comb-3 patterns, where the REs for NR PRS (REs 1202) are in every third subcarrier for a symbol, such that the REs for NR PRS may fit around the REs for LTE CRS in a resource block as shown in FIG. 9 and FIG. 10. Each symbol associated with NR PRS may have a pre-defined frequency offset or a fixed frequency offset with respect to the first symbol. The frequency offset of the first symbol may be provided, and the frequency offsets of the remaining symbols may be derived using a specified method, such as a table. The NR PRS structures can have, for example, 1, 2, 3, 6, 9, or 12 continuous symbols for NR PRS.

In the example illustrated in FIG. 12A, the NR PRS structure has a comb-3 one-symbol pattern, where one symbol has REs for NR PRS signals and the REs for NR PRS occupy every third subcarrier in the symbol. In the example illustrated in FIG. 12B, the NR PRS structure has a comb-3 two-symbol pattern, where two continuous symbols have REs for NR PRS signals and the REs for NR PRS occupy every third subcarrier in each symbol. In the example illustrated in FIG. 12C, the PRS structure has a comb-3 three-symbol pattern, where three continuous symbols have REs for NR PRS signals and the REs for NR PRS occupy every third subcarrier in each symbol. In the example illustrated in FIG. 12D, the NR PRS structure has a comb-3 three-symbol pattern with two repetitions or a comb-3 six-symbol pattern, where six continuous symbols have REs for NR PRS signals and the REs for NR PRS occupy every third subcarrier in each symbol.

Figures 13A, 13B:
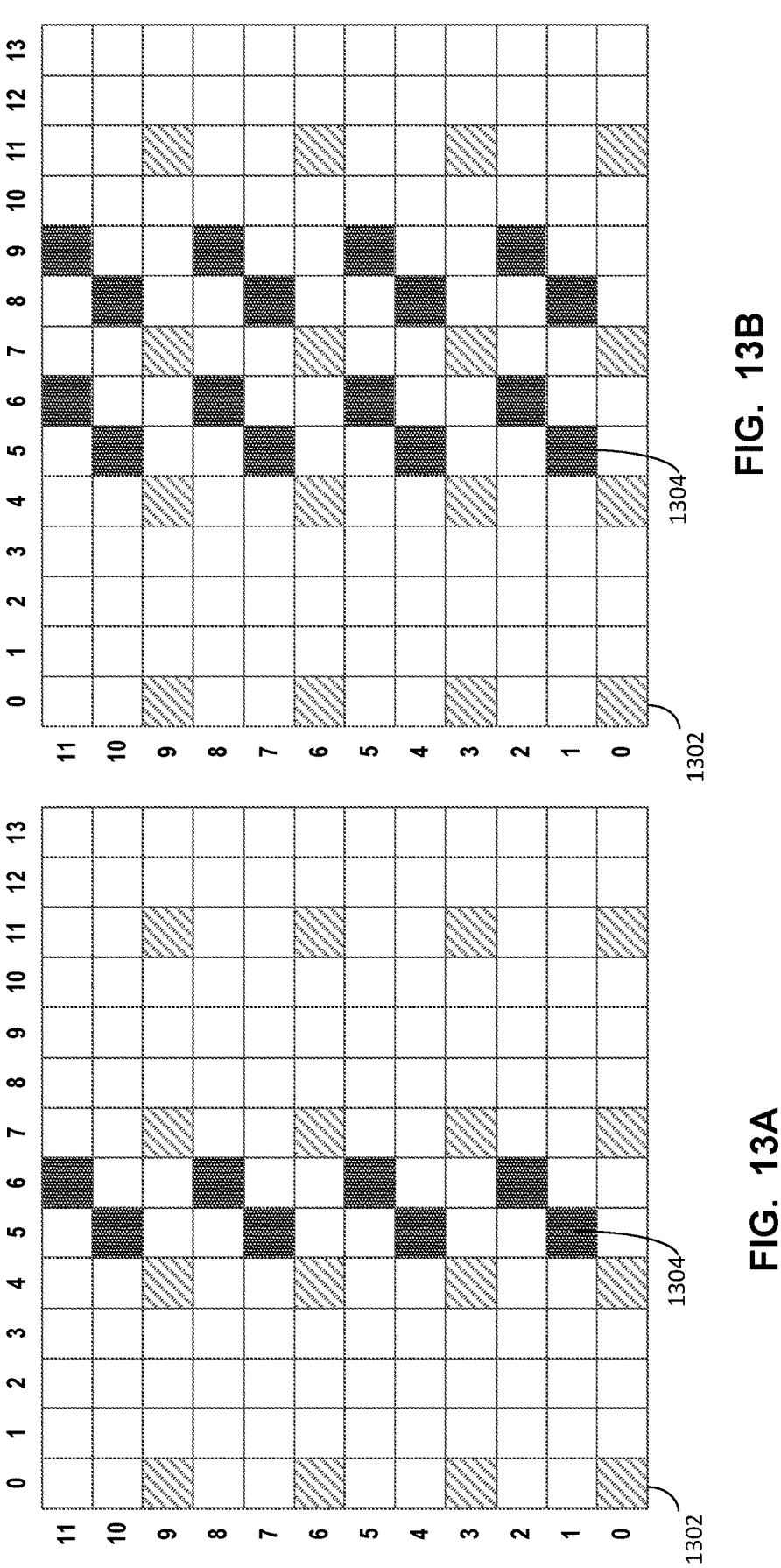
FIG. 13A illustrates an example of associating LTE CRS and NR PRS in a resource block.
FIG. 13B illustrates another example of associating LTE CRS and NR PRS in a resource block.

FIG. 13A illustrates an example of associating LTE CRS and NR PRS in a component carrier. In the illustrated example, REs for LT CRS are represented by REs 1302, which form a comb-3 one-symbol pattern that repeats four times (e.g., in symbols 0, 4, 7, and 11) in a resource block as described above with respect to, for example, FIG. 9. REs for NR PRS (REs 1304) may occupy symbols 5 and 6 (e.g., in a comb-3 two-symbol pattern as shown in FIG. 12B), where the first symbol may have a frequency offset of one subcarrier from subcarrier 0. Thus, REs 1302 for LT CRS and REs 1304 for NR PRS may occupy three continuous symbols (symbols 4, 5, and 6) and all subcarriers (the full frequency range) in a fully staggered pattern (e.g., a comb-3 3-symbol pattern) for positioning.

FIG. 13B illustrates another example of associating LTE CRS and NR PRS in a component carrier. In the illustrated example, REs for LT CRS are represented by REs 1302, which form a comb-3 one-symbol pattern that repeats four times (e.g., in symbols 0, 4, 7, and 11) in a resource block as described above with respect to, for example, FIG. 9. REs for NR PRS (REs 1304) may occupy symbols 5 and 6 (e.g., in a comb-3 two-symbol pattern as shown in FIG. 12B), where the first symbol may have a frequency offset of one subcarrier from subcarrier 0. Thus, the REs 1302 for LT CRS (in symbol 4) and REs 1304 for NR PRS (in symbols 5 and 6) may occupy three continuous symbols 4, 5, and 6, and all subcarriers (the full frequency range) in a fully staggered pattern (e.g., a comb-3 three-symbol pattern) for positioning. In addition, REs for NR PRS (REs 1304) may occupy symbols 8 and 9 (e.g., in a comb-3 two-symbol pattern as shown in FIG. 12B), where the first symbol may have a frequency offset of one subcarrier from subcarrier 0. Thus, REs 1302 for LT CRS (in symbol 7) and REs 1304 for NR PRS may occupy three continuous symbols 7, 8, and 9, and all subcarriers (the full frequency range) in a fully staggered pattern (e.g., a comb-3 three-symbol pattern) for positioning. As such, REs 1302 for LT CRS and REs 1304 for NR PRS may include a comb-3 three-symbol pattern with two repetitions.

It is noted that FIGS. 13A and 13B only illustrate two examples of combinations of the REs for LTE CRS and NR PRS. Other combinations may also be used to associate LT CRS and NR PRS in a resource block. For example, a PRS structure with a comb-3 three-symbol pattern as shown in FIG. 12C may be fit in symbols 8, 9, and 10. Furthermore, although the examples of FIGS. 13A and 13B and other examples herein illustrate combinations of REs for LTE CRS and NR PRS, embodiments are not so limited. For example, alternative embodiments may utilize different combinations of RATs (e.g., including a RAT other than NR, such as 6G, etc.), RE combinations, or the like.

According to certain embodiments, a server (e.g., a serving gNB, serving TRP or LMF) may signal the association between the LTE CRS ports or channels and the NR PRS (or CSI-RS, TRS, DMRS, or SSB signals) ports or channels described above to a UE through, for example, assistance data during an Assistance Data Transfer procedure in an NR positioning session. Based on the received Assistance Data, the UE may determine that there is an association between the LTE CRS and the NR PRS in a configured band (e.g., component carrier) and may receive and process the LTE CRS and the NR PRS to jointly determine information indicating the location of the UE. For example, the UE may receive high-layer (e.g., RRC or LPP) configuration or dynamic (e.g., MAC-CE or DCI) configuration information indicating that a specific PRS, TRP, and/or Frequency Layer is associated with the LTE CRS in the configured band or component carrier. The configuration information may include, for example the configuration of the resource block, such as the comb size, symbol number, frequency offset of the symbols, or the like. The UE may then, based on the received LTE CRS and the NR PRS signals and the association between the LTE CRS and the NR PRS, determine positioning data indicating the location of the UE, such as the reference signal time difference (RSTD), Round Trip signal propagation Time (RTT), RSRP, Observed Time Difference Of Arrival (OTDOA), Down Link (DL) Angle of Departure (AoD), UE Rx-Tx time difference, and the like. The UE or a location server may then determine the location of the UE based on the positioning data associated with multiple TRPs.

Figure 14:
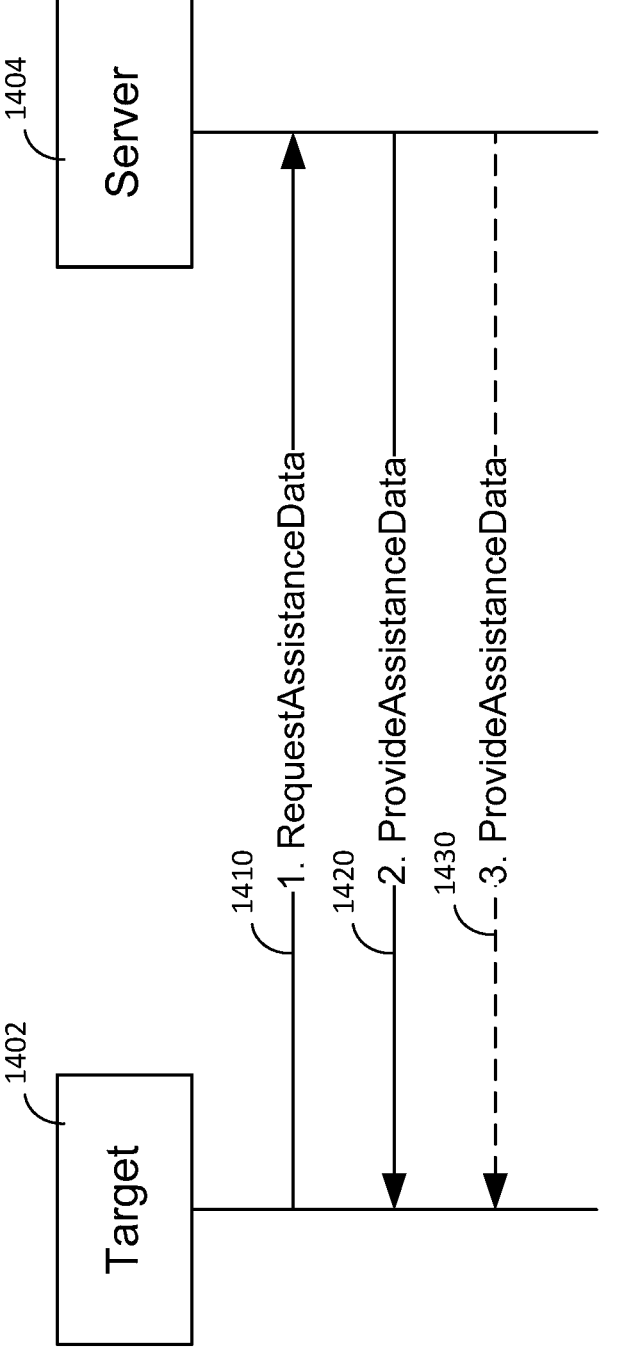
FIG. 14 illustrates an example of an LPP Assistance Data Transfer procedure for LTE CRS and NR PRS association signaling.

FIG. 14 illustrates an example of an LPP Assistance Data Transfer procedure for LTE CRS and NR PRS association signaling according to certain embodiments. The information regarding the association between the LTE CRS and the NR PRS in a configured band (e.g., a component carrier) can be sent by a server 1404 (e.g., a serving gNB or a location server, e.g., an LMF) to a target 1402 (e.g., a UE) in assistance data and/or configuration data during an Assistance Data Transfer procedure (e.g., LPP Assistance Data Transfer procedure) in an NR positioning session. The Assistance Data Transfer procedure enables target 1402 to request assistance data and/or configuration data from server 1404 to assist in positioning, and to enable server 1404 to transfer assistance data and/or configuration data to target 1402 in the absence of a request. For example, at 1410, target 1402 may send a "RequestAssistanceData" message to server 1404. At 1420, server 1404 may respond with a "ProvideAssistanceData" message containing assistance data to target 1402. The transferred assistance data may match or may be a subset of the assistance data requested at 1410. Server 1404 may also provide unrequested information that may be useful to target 1402. In some embodiments, the "ProvideAssistanceData" message may end the transaction. In some embodiments, server 1404 may transmit one or more additional "ProvideAssistanceData" messages containing further assistance data to target 1402 at 1430. The transferred assistance data may match or may be a subset of the assistance data requested in 1410. Server 1404 may also provide unrequested information that may be useful to target 1402 at 1430. The "ProvideAssistanceData" message at 1430 may end the transaction.

The assistance data and/or configuration data sent from server 1404 to target 1402 may include information signaling the association between the NR PRS and the LTE CRS and relationship between the NR PRS and the LTE CRS. An example of the assistance data shown below may provide the following DL-PRS assistance data for a frequency layer, such as the subcarrier spacing, the resource bandwidth, Absolute Radio Frequency Channel Number (ARFCN) (the band where the NR PRS is located), the comb size of the PRS pattern structure, and the PRS Cyclic Prefix. In addition, the assistance data may also indicate whether the PRS channel is associated with an LTE CRS channel using an integer number 0 or 1, where number 0 may indicate no LTE CRS and NR PRS association, whereas number 1 may indicate that the NR PRS channel is associated with the LTE CRS channel.

```
NR-DL-PRS-PositioningFrequencyLayer-r16 ::= SEQUENCE {
    dl-PRS-SubcarrierSpacing-r16      ENUMERATED {kHz15,
    kHz30, kHz60, kHz120, ...},
    dl-PRS-ResourceBandwidth-r16      INTEGER (1..63),
    dl-PRS-StartPRB-r16               INTEGER (0..2176),
    dl-PRS-PointA-r16                 ARFCN-ValueNR-r15,
    dl-PRS-CombSizeN-r16              ENUMERATED {n2, n4,
    n6, n12, ...},
    dl-PRS-CyclicPrefix-r16           ENUMERATED {normal,
    extended, ...},
    dl-PRS-Associated-With-CRS        INTEGER(0,1)
}
```

Similarly, the signaling of the association between an LTE CRS channel and an NR PRS channel may be performed using an RRC configuration procedure, a dynamic Medium Access Control-Control Element (MAC-CE) configuration procedure, a dynamic Downlink Control Information (DCI) configuration procedure, and the like. The signaling may identify a specific PRS channel, TRP, or frequency layer that is associated with an LTE CRS channel in a configured band (e.g., a component carrier).

As described above, 5G NR supports multi-antenna transmission, beam-forming, and simultaneous transmission from multiple geographically separated sites. The antenna ports may be geographically separated, and channels of different antenna ports for a UE may differ in radio channel properties. Two signals transmitted from a same antenna port would generally experience the same radio channel, whereas signals transmitted from two different antenna ports would experience different radio conditions. In some cases, signals transmitted from two different antenna ports may experience radio channels having similar properties. In such cases, the antenna ports are Quasi-Colocation (QCL). Two antenna ports are quasi co-located if the properties of a channel over which a symbol on one antenna port is conveyed can be inferred from the channel over which a symbol on the other antenna port is conveyed. For example, signal A and signal B may be transmitted from Antenna Port 1 and Antenna Port 2, respectively, and may experience common radio channel properties (e.g., Doppler Spread) before they are received by a receiver. In this example, Antenna Port 1 and Antenna Port 2 may be QCL Antenna Ports and signal A and signal B may be QCL Signals.

In some embodiments, the LTE CRS and NR PRS association signaling may also indicate the QCL relationship between the LTE CRS channel and the NR PRS channel, where the source of the QCL may be the LTE CRS channel and the target of the QCL may be an NR PRS with a specific identifier. The association signaling may indicate the QCL type or the common properties the LTE CRS port/channel and the NR PRS port/channel share.

In some embodiments, the association signaling may indicate that the antenna port for the LTE CRS channel and the antenna port for the NR PRS channel are the same port such that the channel over which the NR PRS on the antenna port is conveyed can be inferred from the channel over which the LTE CRS on the same antenna port is conveyed.

In some embodiments, the association signaling may indicate that the antenna port for the LTE CRS channel and the antenna port for the NR PRS channel are the same port with a power offset and/or phase offset between the LTE CRS channel and the NR PRS channel. For example, in the example shown in FIG. 13A, the association signaling may indicate that REs 1302 for LTE CRS signals may have a higher power than REs 1304 for NR PRS signals, and may provide the power and/or phase shift value to the UE.

In some embodiments, the LMF server or serving gNB may provide the CRS information of the serving cell and neighboring cell to the UE.

Figure 16:
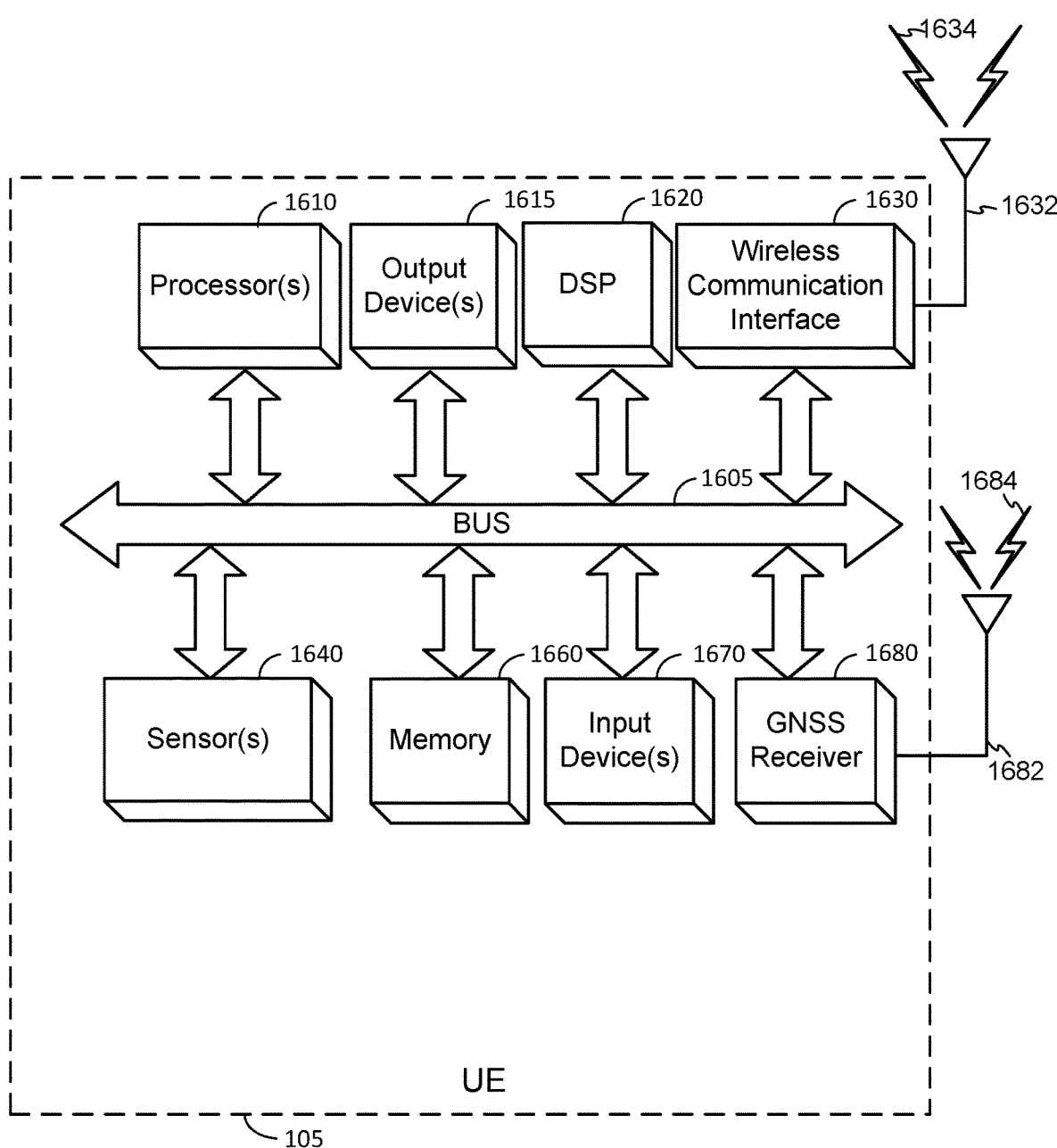
FIG. 16 illustrates an example of a UE according to certain embodiments.

FIG. 15 is a flow diagram 1500 illustrating an example of a method of using associated first reference signals of a first RAT (e.g., LTE CRS) and second reference signals of a second RAT (e.g., NR PRS, TRS, DMRS, SSB, etc.) in a component carrier for UE positioning according to certain embodiments. It is noted that the operations illustrated in FIG. 15 provide particular positioning techniques using associated references signals of different RATs (e.g., LTE CRS and NR PRS signals) in a component carrier. Other sequences of operations can also be performed according to alternative embodiments. For example, alternative embodiments may perform the operation in a different order. Moreover, the individual operations illustrated in FIG. 15 can include multiple sub-operations that can be performed in various sequences as appropriate for the individual operation. Furthermore, some operations can be added or removed depending on the particular applications. In some implementations, two or more operations may be performed in parallel. One of ordinary skill in the art would recognize many variations, modifications, and alternatives. For example, the method described in FIG. 15 may also be used to determine positioning data of UEs using associated NR reference signals (e.g., PRS, CSI-RS, TRS, DMRS, SSB, etc.) and 6G reference signals in a same frequency band. In various embodiments, the means for performing the functionality illustrated in flow diagram 1500 may include, for example, a UE or a TRP described herein, which may include hardware (e.g., transceivers and processors) and/or software components for performing the described functionality. For example, means for performing the operations in flow diagram 1500 may include various components of a UE, such as a wireless communication interface 1630, wireless communication antenna(s) 1632, a bus 1605, a digital signal processor (DSP) 1620, processor(s) 1610, memory 1660, and/or other components of a UE 105, as illustrated in FIG. 16 below.

At block 1510, the UE may receive assistance data and/or configuration data indicating the transmission of first reference signals of a first RAT and second reference signals of a second RAT in a same frequency band, such as a component carrier. The assistance data and/or configuration data may be sent to the UE from, for example, a serving gNB or a location server, such as an LMF server. The UE may receive the assistance data and/or configuration data during an Assistance Data Transfer procedure as described above, for example, with respect to FIG. 14. In some embodiments, the assistance data and/or configuration data may be included in an LPP configuration, an RRC configuration, a MAC-CE configuration, or a DCI configuration.

In some embodiments, the assistance data may include certain configuration data. For example, the assistance data may include parameters of a downlink PRS channel, such as a subcarrier spacing, a resource bandwidth, the frequency band, an ARFCN, a comb size of a PRS pattern in a resource block, and/or a PRS Cyclic Prefix of the PRS channel. In some embodiments, the assistance data may include the QCL relationship between an LTE CRS channel for the LTR CRS and an NR PRS channel for the NR PRS. In some embodiments, the assistance data may indicate that the LTE CRS and the NR PRS are on a same antenna port. In some embodiments, the assistance data may indicate that the LTE CRS and the NR PRS are on a same antenna port but with a power or phase offset between the LTE CRS and the NR PRS. In some embodiments, the assistance data may indicate the arrangement of REs for LTE CRS and the REs for NR PRS in a resource block, including the comb size, the number of symbol periods occupied, the number of repetitions, and the frequency offset of the NR PRS resource elements in each occupied symbol period of a resource block. In some embodiments, the assistance data may indicate that an NR PRS channel, a TRP, or a Frequency layer is associated with the LTE CRS. Means for performing the operation at block 1510 may include various components of a UE, such as a wireless communication interface 1630, wireless communication antenna(s) 1632, a bus 1605, a digital signal processor (DSP) 1620, processor(s) 1610, memory 1660, and/or other components of a UE 105, as illustrated in FIG. 16 below.

At block 1520, based on the assistance data and/or configuration data, the UE may determine that the first reference signals and the second reference signals (e.g., LTE CRS and the NR PRS signals) are deployed in the same frequency band. For example, as described above, the assistance data may include information regarding a specific PRS channel, TRP, or frequency layer and an indication that the specific PRS channel, TRP, or frequency layer. Means for performing the operation at block 1520 may include various components of a UE, such as a wireless communication interface 1630, wireless communication antenna(s) 1632, a bus 1605, a digital signal processor (DSP) 1620, processor(s) 1610, memory 1660, and/or other components of a UE 105, as illustrated in FIG. 16 below.

At block 1530, the UE may receive the first reference signals and the second reference signals in the same frequency band from one or more network nodes, such as one or more base stations, TRPs, and/or UEs. For example, where the first RAT is LTE, the resource elements for the second reference signals may be arranged around the resource elements for the first reference signals in an OFDM resource block according to a comb-3 pattern described above. The resource elements for the second reference signals may be in 1, 2, 3, 6, 9, or 12 symbol periods of an OFDM resource block. In one example, the resource elements for the second reference signals may be in symbol periods 5 and 6 of the OFDM resource block, and/or may use subcarriers not used for the first reference signals, such that the resource elements for first reference signals and second reference signals may form a fully staggered pattern in the frequency domain to utilize the full bandwidth of the resource block. In some embodiments, the resource elements for the second reference signals may also be repeated in symbol periods 8 and 9 of the OFDM resource block. Means for performing the operation at block 1530 may include various components of a UE, such as a wireless communication interface 1630, wireless communication antenna(s) 1632, a bus 1605, a digital signal processor (DSP) 1620, processor(s) 1610, memory 1660, and/or other components of a UE 105, as illustrated in FIG. 16 below.

At block 1540, the UE may determine the association between the first reference signals (e.g., LTE CRS) and the second reference signals (e.g., NR PRS) in the frequency band based on the configuration data of the first RAT, the second RAT, or both. For example, when the first RAT is LTE and the second RAT is NR, the configuration data may be received in the second RAT. When the first RAT is NR and the second RAT is 6G, the configuration data may be received in the first RAT, second RAT, or both. In some embodiments, the configuration data may be included in the assistance data from a location server, high-layer (e.g. RRC) messages received from the serving gNB, or dynamic (e.g. MAC-CE or DCI) messages received by the serving gNB as described above. The configuration data may include parameters of a downlink PRS channel, such as a subcarrier spacing, a resource bandwidth, the frequency band, an Absolute Radio Frequency Channel Number (ARFCN), a comb size of a PRS pattern in a resource block, or a PRS Cyclic Prefix of the downlink PRS channel. In some embodiments, the configuration data may include QCL relationship between an LTE CRS channel for the LTE CRS and an NR PRS channel for the NR PRS. The QCL relationship may include an average gain, an average delay, a delay spread, a doppler shift, a doppler spread, a spatial Rx, or any combination thereof. In some embodiments, the configuration data may indicate that the LTE CRS and the NR PRS are on a same antenna port. In some embodiments, the configuration data may indicate that the LTE CRS and the NR PRS are on a same antenna port but with a power or phase offset between the LTE CRS and the NR PRS. In some embodiments, the configuration data indicates a frequency offset of a resource element in a symbol period of a resource block. Means for performing the operation at block 1540 may include various components of a UE, such as a wireless communication interface 1630, wireless communication antenna(s) 1632, a bus 1605, a digital signal processor (DSP) 1620, processor(s) 1610, memory 1660, and/or other components of a UE 105, as illustrated in FIG. 16 below.

At block 1550, the UE or a server may determine positioning data associated with the location of the UE based on both the first reference signals (e.g., LTE CRS signals) and the second reference signals (e.g., NR PRS signals) received from the one or more network nodes and the association between the first reference signals and the second reference signals. The positioning data associated with the location of the UE comprises reference signal time difference (RSTD), Round Trip signal propagation Time (RTT), RSRP, Observed Time Difference Of Arrival (OTDOA), Down Link (DL) Angle of Departure (AoD), or UE Rx-Tx time difference, or a combination thereof. As described above, the UE may determine the location of the UE using one or more of the DL-TDOA technique, DL-AoD technique, and multi-RTT technique. In some embodiments, the UE may provide the determined location to a location server. In some embodiments, the UE may provide the measured positioning data to a location server such that the location server may determine the location of the UE. Means for performing the operation at block 1550 may include various components of a UE, such as a wireless communication interface 1630, wireless communication antenna(s) 1632, a bus 1605, a digital signal processor (DSP) 1620, processor(s) 1610, memory 1660, and/or other components of a UE 105, as illustrated in FIG. 16 below.

In some embodiments, a UE may perform additional operations in a positioning session with a location server. For example, according to some embodiments, a UE may provide, prior to receiving the configuration and the assistance data, capabilities of the UE related to performing the LTE CRS and NR PRS measurements to a location server. Providing the capabilities of the UE may include providing an indication of an ability of the UE to receive multiple PRS resources from multiple FLs, a number of FLs for which the UE can receive PRS resources during a measurement, FLs that can be received by the UE during a common set of OFDM symbols, FLs that cannot be received by the UE during a common set of OFDM symbols, one or more frequency bands in which the UE is capable of receiving PRS resources, or any combination thereof.

FIG. 16 illustrates an embodiment of a UE 105, which can be utilized as described herein above (e.g., in association with FIGS. 1-15). For example, the UE 105 can perform one or more of the functions of the method shown in FIG. 15. It should be noted that FIG. 16 is meant only to provide a generalized illustration of various components, any or all of which may be utilized as appropriate. It can be noted that, in some instances, components illustrated by FIG. 16 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 16.

The UE 105 is shown comprising hardware elements that can be electrically coupled via a bus 1605 (or may otherwise be in communication, as appropriate). The hardware elements may include a processor(s) 1610 which can include without limitation one or more general-purpose processors, one or more special-purpose processors (such as DSP chips, graphics acceleration processors, application specific integrated circuits (ASICs), and/or the like), and/or other processing structures or means. As shown in FIG. 16, some embodiments may have a separate DSP 1620, depending on desired functionality. Location determination and/or other determinations based on wireless communication may be provided in the processor(s) 1610 and/or wireless communication interface 1630 (discussed below). The UE 105 also can include one or more input devices 1670, which can include without limitation one or more keyboards, touch screens, touch pads, microphones, buttons, dials, switches, and/or the like; and one or more output devices 1615, which can include without limitation one or more displays (e.g., touch screens), light emitting diodes (LEDs), speakers, and/or the like.

The UE 105 may also include a wireless communication interface 1630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. As such, the wireless communication interface 1630 can include RF circuitry capable of being tuned between an active BWP and one or additional bands having one or more FLs used for PRS signals, as described herein. The wireless communication interface 1630 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1632 that send and/or receive wireless signals 1634. According to some embodiments, the wireless communication antenna(s) 1632 may comprise a plurality of discrete antennas, antenna arrays, or any combination thereof.

Depending on desired functionality, the wireless communication interface 1630 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 3" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1640. Sensors 1640 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1680 capable of receiving signals 1684 from one or more GNSS satellites using an antenna 1682 (which could be the same as wireless communication antenna 1632). Positioning based on GNSS signal measurement can be utilized to complement and/or incorporate the techniques described herein. The GNSS receiver 1680 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1680 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1680 is illustrated in FIG. 16 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1610, DSP 1620, and/or a processor within the wireless communication interface 1630 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1610 or DSP 1620.

The UE 105 may further include and/or be in communication with a memory 1660. The memory 1660 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1660 of the UE 105 also can comprise software elements (not shown in FIG. 16), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1660 that are executable by the UE 105 (and/or processor(s) 1610 or DSP 1620 within UE 105). In an aspect, then such code and/or instructions can be used to configure and/or adapt a general-purpose computer (or other device) to perform one or more operations in accordance with the described methods.

Figure 17:
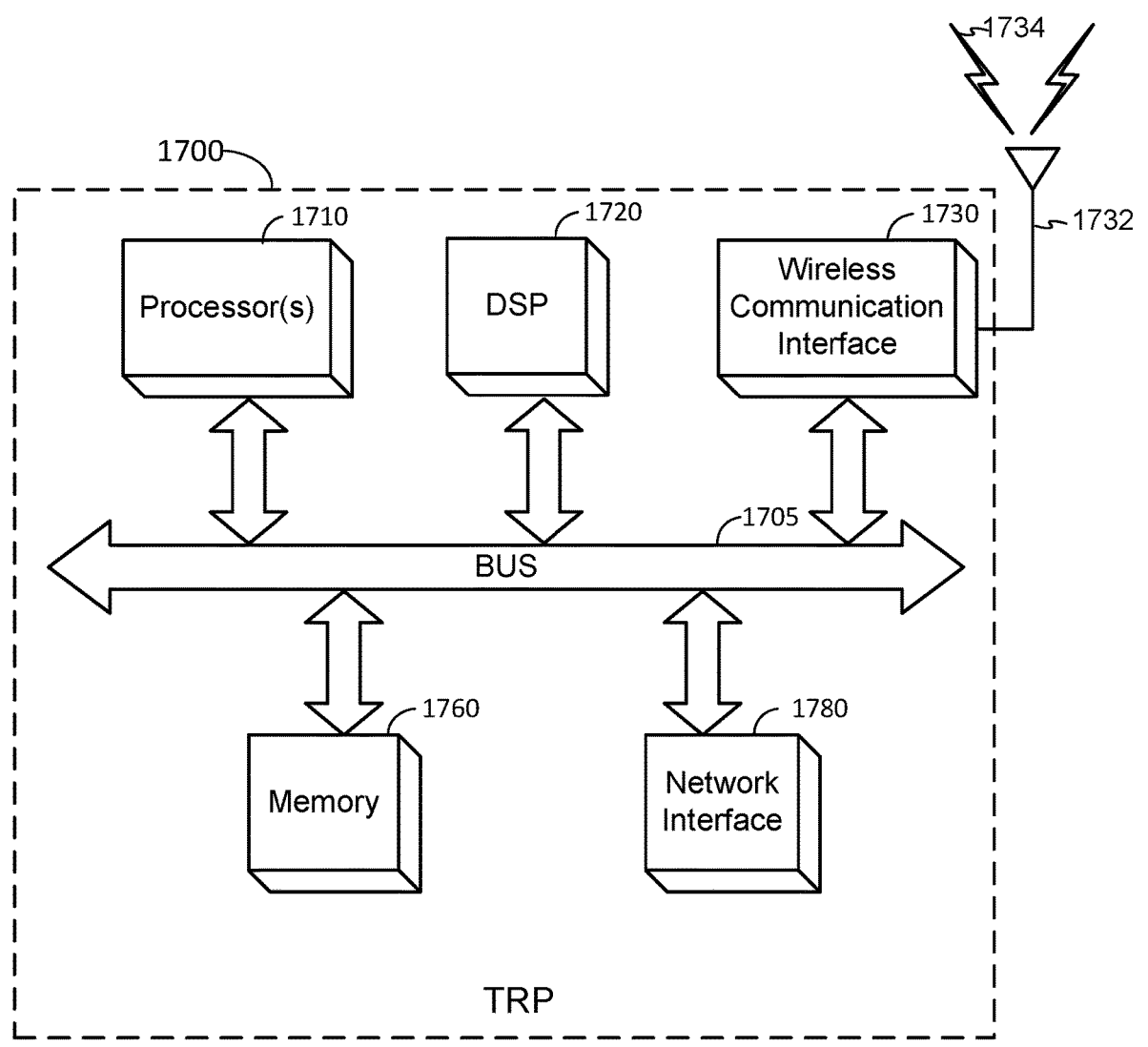
FIG. 17 illustrates an example of a TRP according to certain embodiments.

FIG. 17 illustrates an embodiment of a TRP 1700, which can be utilized as described herein above (e.g., in association with FIGS. 1-15). It should be noted that FIG. 17 is meant only to provide a generalized illustration of various components, any or all of which may be utilized as appropriate. The TRP 1700 is shown comprising hardware elements that can be electrically coupled via a bus 1705 (or may otherwise be in communication, as appropriate). The hardware elements may include a processor(s) 1710 which can include without limitation one or more general-purpose processors, one or more special-purpose processors (such as DSP chips, graphics acceleration processors, ASICs, and/or the like), and/or other processing structure or means. As shown in FIG. 17, some embodiments may have a separate DSP 1720, depending on desired functionality. Location determination and/or other determinations based on wireless communication may be provided in the processor(s) 1710 and/or wireless communication interface 1730 (discussed below), according to some embodiments. The TRP 1700 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 1700 might also include a wireless communication interface 1730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 1700 to communicate as described herein. The wireless communication interface 1730 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1732 that send and/or receive wireless signals 1734.

The TRP 1700 may also include a network interface 1780, which can include support of wireline communication technologies. The network interface 1780 may include a modem, network card, chipset, and/or the like. The network interface 1780 may include one or more input and/or output communication interfaces to permit data to be exchanged with a network, communication network servers, computer systems, and/or any other electronic devices described herein.

In many embodiments, the TRP 1700 may further comprise a memory 1760. The memory 1760 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1760 of the TRP 1700 also may comprise software elements (not shown in FIG. 17), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1760 that are executable by the TRP 1700 (and/or processor(s) 1710 or DSP 1720 within TRP 1700). In an aspect, then such code and/or instructions can be used to configure and/or adapt a general-purpose computer (or other device) to perform one or more operations in accordance with the described methods.

Figure 18:
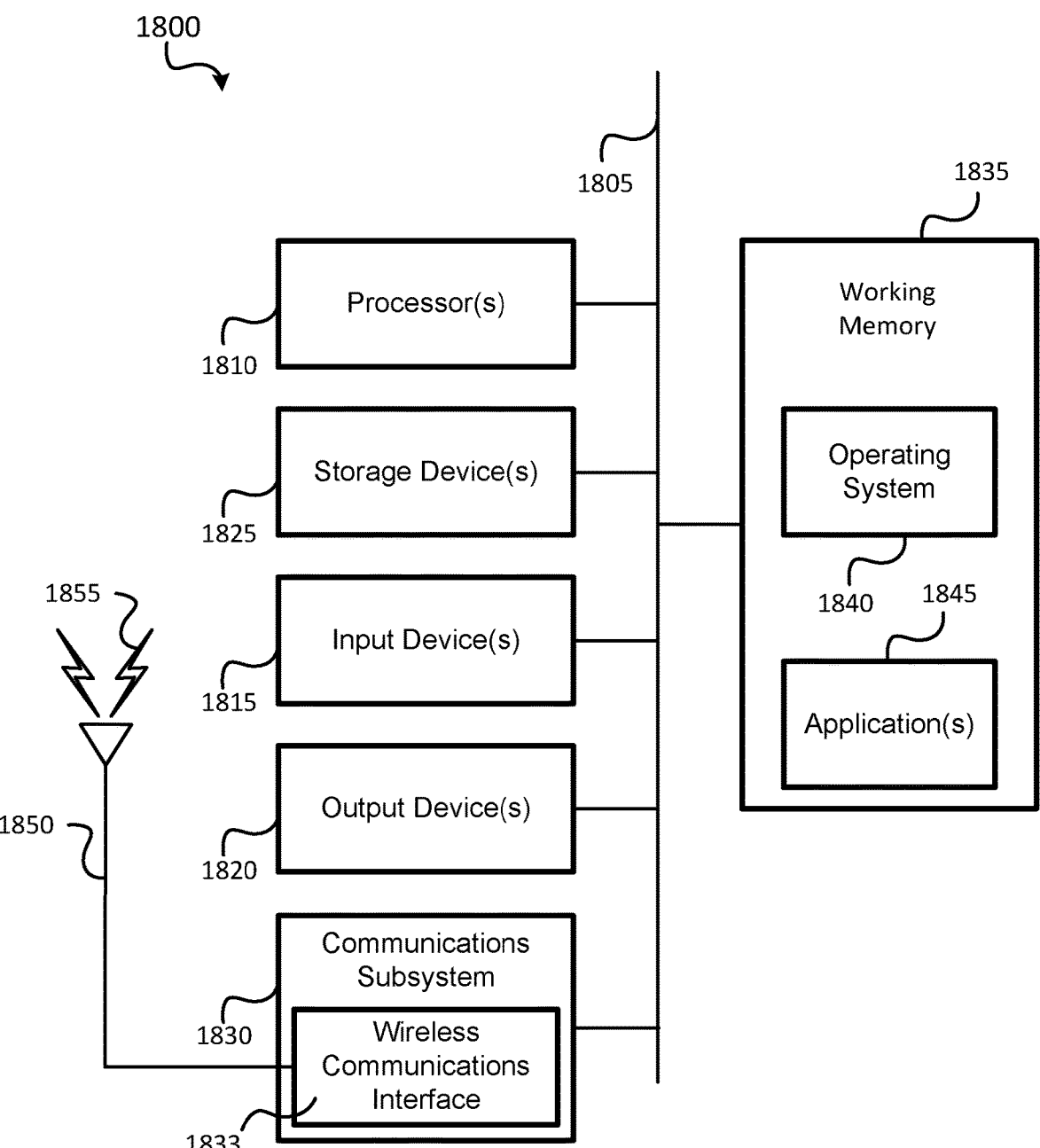
FIG. 18 is a block diagram of an example of a computer system according to certain embodiments.

FIG. 18 is a block diagram of an embodiment of a computer system 1800, which may be used, in whole or in part, to provide the functions of one or more network components as described in the embodiments herein (e.g., location server 160 of FIG. 1, LMF 220 of FIG. 2, etc.). It should be noted that FIG. 18 is meant only to provide a generalized illustration of various components, any or all of which may be utilized as appropriate. FIG. 18, therefore, broadly illustrates how individual system elements may be implemented in a relatively separated or relatively more integrated manner. In addition, it can be noted that components illustrated by FIG. 18 can be localized to a single device and/or distributed among various networked devices, which may be disposed at different geographical locations.

The computer system 1800 is shown comprising hardware elements that can be electrically coupled via a bus 1805 (or may otherwise be in communication, as appropriate). The hardware elements may include processor(s) 1810, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1800 also may comprise one or more input devices 1815, which may comprise without limitation a mouse, a keyboard, a camera, a microphone, and/or the like; and one or more output devices 1820, which may comprise without limitation a display device, a printer, and/or the like.

The computer system 1800 may further include (and/or be in communication with) one or more non-transitory storage devices 1825, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1800 may also include a communications subsystem 1830, which may comprise wireless communication technologies managed and controlled by a wireless communication interface 1833, as well as wired technologies (such as Ethernet, coaxial communications, universal serial bus (USB), and the like). The wireless communication interface 1833 may send and receive wireless signals 1855 (e.g., signals according to 5G NR or LTE) via wireless antenna(s) 1850. Thus the communications subsystem 1830 may comprise a modem, a network card (wireless or wired), an infrared communication device, a wireless communication device, and/or a chipset, and/or the like, which may enable the computer system 1800 to communicate on any or all of the communication networks described herein to any device on the respective network, including a User Equipment (UE), base stations and/or other TRPs, and/or any other electronic devices described herein. Hence, the communications subsystem 1830 may be used to receive and send data as described in the embodiments herein.

In many embodiments, the computer system 1800 will further comprise a working memory 1835, which may comprise a RAM or ROM device, as described above. Software elements, shown as being located within the working memory 1835, may comprise an operating system 1840, device drivers, executable libraries, and/or other code, such as one or more applications 1845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1825 described above. In some cases, the storage medium might be incorporated within a computer system, such as computer system 1800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1800 and/or might take the form of source and/or installable code, which, upon compilation and/or installation on the computer system 1800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc. Similarly, the term "or a combination thereof" if used to associate a list, (e.g., "A, B, or C, or a combination thereof") can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description, embodiments may include different combinations of features. Implementation examples are described in the following numbered clauses:

Clause 1. A method of determining a location of a User Equipment (UE), the method comprising: receiving, by the UE, assistance data indicating transmission of first reference signals of a first Radio Access Technology (RAT) and second reference signals of a second RAT in a frequency band; determining, by the UE based on the assistance data, that the first reference signals and the second reference signals are deployed in the frequency band; receiving, by the UE from one or more network nodes, the first reference signals and the second reference signals in the frequency band; determining an association between the first reference signals and the second reference signals based at least in part on configuration data; and determining, based on both the first reference signals and the second reference signals received from the one or more network nodes and the determined association between the first reference signals and the second reference signals, positioning data associated with the location of the UE.

Clause 2. The method of clause 1, wherein the first RAT is Long-Term Evolution (LTE).

Clause 3. The method of any of clauses 1-2 wherein resource elements for the second reference signals: are arranged around resource elements for the first reference signals according to a comb-3 pattern in an Orthogonal Frequency-Division Multiplexing (OFDM) resource block, are in 1, 2, 3, 6, 9, or 12 symbol periods of an OFDM resource block, are in symbol periods 5 and 6 of an OFDM resource block, use subcarriers not used for the first reference signals in an OFDM resource block, or are in symbol periods 5, 6, 8, and 9 of an OFDM resource block.

Clause 4. The method of any of clauses 1-3 wherein the second reference signals include NR Positioning Reference Signals (PRS), Channel State Information Reference Signal (CSI-RS), Tracking Reference Signal (TRS), Demodulation Reference Signal (DMRS), or Synchronization Signal Block (SSB).

Clause 5. The method of any of clauses 1-4 wherein the second RAT is NR.

Clause 6. The method of any of clauses 1-5 wherein receiving the assistance data comprises: receiving the assistance data from a serving next generation NodeB (gNB) or a Location Management Function (LMF) server, or performing an Assistance Data Transfer procedure, or a combination thereof.

Clause 7. The method of any of clauses 1-6 wherein the configuration data is included in an LTE Positioning Protocol (LPP) configuration, a Radio Resource Control (RRC) configuration, a Medium Access Control-Control Element (MAC-CE) configuration, or a Downlink Control Information (DCI) configuration, or a combination thereof.

Clause 8. The method of any of clauses 1-7 wherein the first reference signals include LTE Cell-specific Reference Signals (CRS).

Clause 9. The method of clause 8 wherein the assistance data indicates that an NR PRS channel, a Transmission Reception Points (TRPs), or a Frequency layer is associated with the LTE CRS.

Clause 10. The method of any of clauses 8-9 wherein the configuration data comprises QCL relationship between an LTE CRS channel for the LTE CRS and an NR PRS channel for NR PRS.

Clause 11. The method of clause 10 wherein the QCL relationship comprises an average gain, an average delay, a delay spread, a doppler shift, a doppler spread, or a spatial Rx, or a combination thereof.

Clause 12. The method of any of clauses 8-11 wherein the configuration data indicates that: the LTE CRS and NR PRS are on a same antenna port, or the LTE CRS and the NR PRS are on a same antenna port but with a power or phase offset between the LTE CRS and the NR PRS.

Clause 13. The method of any of clauses 8-12 wherein NR PRS and the LTE CRS have a same bandwidth, a same center frequency, or both.

Clause 14. The method of any of clauses 8-13 further comprising providing, by the UE to a location server, a capability of the UE to receive the LTE CRS and NR PRS.

Clause 15. The method of clause 1 wherein the first RAT is NR and the second RAT is sixth-Generation wireless (6G).

Clause 16. The method of any of clauses 1-15 wherein the configuration data comprises parameters of a downlink PRS channel, the parameters of the downlink PRS channel comprising a subcarrier spacing, a resource bandwidth, the frequency band, an Absolute Radio Frequency Channel Number (ARFCN), a comb size of a PRS pattern in a resource block, or a PRS Cyclic Prefix of the downlink PRS channel, or a combination thereof.

Clause 17. The method of any of clauses 1-16 wherein the configuration data includes: at least a part of the assistance data received by the UE from a location server, at least a part of high-layer message received by the UE from a serving gNB, or at least a part of dynamic message received by the UE from a serving gNB.

Clause 18. The method of any of clauses 1-17 wherein the configuration data indicates a frequency offset of a resource element in a symbol period of a resource block.

Clause 19. The method of any of clauses 1-18 wherein determining the location of the UE comprises determining the location of the UE using: a downlink Time Difference of Arrival (DL-TDOA) technique; a downlink Angle of Departure (DL-AoD) technique; or a multi-Round-Trip Time (multi-RTT) technique, or a combination thereof.

Clause 20. The method of any of clauses 1-19 wherein determining the association between the first reference signals and the second reference signals comprises determining the association based on configuration data in the first RAT, the second RAT, or both.

Clause 21. The method of clause 1 wherein the first RAT is LTE, the second RAT is NR, and the configuration data is received in the second RAT, or the first RAT is NR, the second RAT is 6G, and the configuration data is received in the first RAT, second RAT, or both.

Clause 22. The method of any of clauses 1-21 wherein the positioning data associated with the location of the UE comprises reference signal time difference (RSTD), Round Trip signal propagation Time (RTT), Reference Signal Receive Power (RSRP), Observed Time Difference Of Arrival (OTDOA), Down Link (DL) Angle of Departure (AoD), or UE Rx-Tx time difference, or a combination thereof.

Clause 23. A User Equipment (UE) for determining a location of the UE, the UE comprising: a transceiver; a memory; and one or more processors communicatively coupled with the transceiver and the memory, wherein the one or more processors are configured to: receive, via the transceiver, assistance data indicating transmission of first reference signals of a first Radio Access Technology (RAT) and second reference signals of a second RAT in a frequency band; determine that the first reference signals and the second reference signals are deployed in the frequency band; receive, via the transceiver, the first reference signals and the second reference signals in the frequency band; determine an association between the first reference signals and the second reference signals based at least in part on configuration data; and determine, based on both the first reference signals and the second reference signals received from the one or more network nodes and the determined association between the first reference signals and the second reference signals, positioning data associated with the location of the UE.

Clause 24. The UE of clause 23, wherein the one or more processors are configured to receive the first reference signals in which the first RAT comprises Long-Term Evolution (LTE).

Clause 25. The UE of any of clauses 23-24 wherein the one or more processors are configured to receive the second reference signals in which resource elements for the second reference signals: are arranged around resource elements for the first reference signals according to a comb-3 pattern in an Orthogonal Frequency-Division Multiplexing (OFDM) resource block, are in 1, 2, 3, 6, 9, or 12 symbol periods of an OFDM resource block, are in symbol periods 5 and 6 of an OFDM resource block, use subcarriers not used for the first reference signals in an OFDM resource block, or are in symbol periods 5, 6, 8, and 9 of an OFDM resource block.

Clause 26. The UE of any of clauses 23-25 wherein, to receive the second reference signals, the one or more processors are configured to receive NR Positioning Reference Signals (PRS), Channel State Information Reference Signal (CSI-RS), Tracking Reference Signal (TRS), Demodulation Reference Signal (DMRS), or Synchronization Signal Block (SSB).

Clause 27. The UE of any of clauses 23-26 wherein the one or more processors are configured to receive the second reference signals in which the second RAT comprises NR.

Clause 28. The UE of any of clauses 23-27 wherein, to receive the assistance data, the one or more processors are configured to receive the assistance data from a serving next generation NodeB (gNB) or a Location Management Function (LMF) server, or perform an Assistance Data Transfer procedure, or a combination thereof.

Clause 29. The UE of any of clauses 23-28 wherein the one or more processors are configured to obtain the configuration data from an LTE Positioning Protocol (LPP) configuration, a Radio Resource Control (RRC) configuration, a Medium Access Control-Control Element (MAC-CE) configuration, or a Downlink Control Information (DCI) configuration, or a combination thereof.

Clause 30. The UE of any of clauses 23-29 wherein, to receive the first reference signals, the one or more processors are configured to receive LTE Cell-specific Reference Signals (CRS).

Clause 31. The UE of any of clauses 23-30 wherein the one or more processors are configured to obtain, from the assistance data, an indication that an NR PRS channel, a Transmission Reception Points (TRPs), or a Frequency layer is associated with the LTE CRS.

Clause 32. The UE of any of clauses 23-31 wherein the one or more processors are configured to obtain, from the configuration data, a QCL relationship between an LTE CRS channel for the LTE CRS and an NR PRS channel for NR PRS.

Clause 33. The UE of any of clauses 23-32 wherein the one or more processors are configured to determine, from the QCL relationship, an average gain, an average delay, a delay spread, a doppler shift, a doppler spread, or a spatial Rx, or a combination thereof.

Clause 34. The UE of any of clauses 23-33 wherein the one or more processors are configured to obtain, from the configuration data, an indication that: the LTE CRS and NR PRS are on a same antenna port, or the LTE CRS and the NR PRS are on a same antenna port but with a power or phase offset between the LTE CRS and the NR PRS.

Clause 35. The UE of any of clauses 23-34 wherein the one or more processors are configured to receive NR PRS and the LTE CRS having a same bandwidth, a same center frequency, or both.

Clause 36. The UE to a location server of any of clauses 23-35 wherein the one or more processors are further configured to provide, to a location server, a capability of the UE to receive the LTE CRS and NR PRS.

Clause 37. The UE of any of clauses 23-36 wherein the one or more processors are configured to receive the first reference signals and the second reference signals in which the first RAT is NR and the second RAT is sixth-Generation wireless (6G).

Clause 38. The UE of any of clauses 23-37 wherein the one or more processors are configured to obtain, from the configuration data, parameters of a downlink PRS channel, the parameters of the downlink PRS channel comprising a subcarrier spacing, a resource bandwidth, the frequency band, an Absolute Radio Frequency Channel Number (ARFCN), a comb size of a PRS pattern in a resource block, or a PRS Cyclic Prefix of the downlink PRS channel, or a combination thereof.

Clause 39. The UE of any of clauses 23-38 wherein the one or more processors are configured to obtain, from the configuration data: at least a part of the assistance data received by the UE from a location server, at least a part of high-layer message received by the UE from a serving gNB, or at least a part of dynamic message received by the UE from a serving gNB.

Clause 40. The UE of any of clauses 23-39 wherein the one or more processors are configured to obtain, from the configuration data, an indication of a frequency offset of a resource element in a symbol period of a resource block.

Clause 41. The UE of any of clauses 23-40 wherein, to determine the location of the UE, the one or more processors are configured to determine the location of the UE using a downlink Time Difference of Arrival (DL-TDOA) technique; a downlink Angle of Departure (DL-AoD) technique; or a multi-Round-Trip Time (multi-RTT) technique, or a combination thereof.

Clause 42. The UE of any of clauses 23-41 wherein the one or more processors are configured to determine the association between the first reference signals and the second reference signals based on configuration data in the first RAT, the second RAT, or both.

Clause 43. The UE of any of clauses 23-42 wherein the one or more processors are configured to: receive the configuration data in the second RAT, wherein the first RAT comprises LTE and the second RAT comprises NR; or receive the configuration data in the first RAT, second RAT, or both, wherein the first RAT comprises NR, the second RAT comprises 6G.

Clause 44. The UE of any of clauses 23-43 wherein, to determine the positioning data associated with the location of the UE, the one or more processors are configured to determine reference signal time difference (RSTD), Round Trip signal propagation Time (RTT), Reference Signal Receive Power (RSRP), Observed Time Difference Of Arrival (OTDOA), Down Link (DL) Angle of Departure (AoD), or UE Rx-Tx time difference, or a combination thereof.

Clause 45. An apparatus for determining a location of a User Equipment (UE), the apparatus comprising means for performing the method of any of clauses 1-22.

Clause 46. A non-transitory computer-readable medium storing instructions for determining a location of a User Equipment (UE), the instructions comprising code for performing the method of any of clauses 1-22.

What is claimed is:

1. A method of determining a location of a User Equipment (UE), the method comprising:

receiving, by the UE, assistance data indicating transmission of first reference signals of a first Radio Access Technology (RAT) and second reference signals of a second RAT in a frequency band;

determining, by the UE based on the assistance data, that the first reference signals and the second reference signals are deployed in the frequency band;

receiving, by the UE from one or more network nodes, the first reference signals and the second reference signals in the frequency band, wherein, for at least one orthogonal frequency-division multiplexing (OFDM) resource block corresponding to the frequency band, resource elements of the at least one OFDM resource block corresponding to the first reference signals form a comb pattern with resource elements of the at least one OFDM resource block corresponding to the second reference signals, the comb pattern comprising a pattern of consecutive symbols within a slot and having a fully frequency-domain staggered pattern;

determining an association between the first reference signals and the second reference signals based at least in part on configuration data; and determining, based on both the first reference signals and the second reference signals received from the one or more network nodes and the determined association between the first reference signals and the second reference signals, positioning data associated with the location of the UE.

2. The method of claim 1, wherein the first RAT is Long-Term Evolution (LTE).

3. The method of claim 2, wherein the second reference signals include NR Positioning Reference Signals (PRS), Channel State Information Reference Signal (CSI-RS), Tracking Reference Signal (TRS), Demodulation Reference Signal (DMRS), or Synchronization Signal Block (SSB).

4. The method of claim 2, wherein the second RAT is NR.

5. The method of claim 4, wherein receiving the assistance data comprises:

receiving the assistance data from a serving next generation NodeB (gNB) or a Location Management Function (LMF) server, or performing an Assistance Data Transfer procedure, or a combination thereof.

6. The method of claim 4, wherein the configuration data is included in an LTE Positioning Protocol (LPP) configuration, a Radio Resource Control (RRC) configuration, a Medium Access Control-Control Element (MAC-CE) configuration, or a Downlink Control Information (DCI) configuration, or a combination thereof.

7. The method of claim 4, wherein the first reference signals include LTE Cell-specific Reference Signals (CRS).

8. The method of claim 7, wherein the assistance data indicates that an NR PRS channel, a Transmission Reception Points (TRPs), or a Frequency layer is associated with the LTE CRS.

9. The method of claim 7, wherein the configuration data comprises QCL relationship between an LTE CRS channel for the LTE CRS and an NR PRS channel for NR PRS.

10. The method of claim 7, wherein the configuration data indicates that:

the LTE CRS and NR PRS are on a same antenna port, or the LTE CRS and the NR PRS are on a same antenna port but with a power or phase offset between the LTE CRS and the NR PRS.

11. The method of claim 1, wherein the configuration data comprises parameters of a downlink PRS channel, the parameters of the downlink PRS channel comprising a subcarrier spacing, a resource bandwidth, the frequency band, an Absolute Radio Frequency Channel Number (ARFCN), a comb size of a PRS pattern in a resource block, or a PRS Cyclic Prefix of the downlink PRS channel, or a combination thereof.

12. The method of claim 1, wherein the configuration data includes:

at least a part of the assistance data received by the UE from a location server, at least a part of high-layer message received by the UE from a serving gNB, or at least a part of dynamic message received by the UE from a serving gNB.

13. The method of claim 1, wherein determining the association between the first reference signals and the second reference signals comprises determining the association based on configuration data in the first RAT, the second RAT, or both.

14. The method of claim 1, wherein the positioning data associated with the location of the UE comprises reference signal time difference (RSTD), Round Trip signal propagation Time (RTT), Reference Signal Receive Power (RSRP), Observed Time Difference Of Arrival (OTDOA), Down Link (DL) Angle of Departure (AoD), or UE Rx-Tx time difference, or a combination thereof.

15. A User Equipment (UE) for determining a location of the UE, the UE comprising:

a transceiver;

a memory; and one or more processors communicatively coupled with the transceiver and the memory, wherein the one or more processors are configured to:

receive, via the transceiver, assistance data indicating transmission of first reference signals of a first Radio Access Technology (RAT) and second reference signals of a second RAT in a frequency band;

determine that the first reference signals and the second reference signals are deployed in the frequency band;

receive, via the transceiver from one or more network nodes, the first reference signals and the second reference signals in the frequency band, wherein, for at least one orthogonal frequency-division multiplexing (OFDM) resource block corresponding to the frequency band, resource elements of the at least one OFDM resource block corresponding to the first reference signals form a comb pattern with resource elements of the at least one OFDM resource block corresponding to the second reference signals, the comb pattern comprising a pattern of consecutive symbols within a slot and having a fully frequency-domain staggered pattern;

determine an association between the first reference signals and the second reference signals based at least in part on configuration data; and determine, based on both the first reference signals and the second reference signals received from the one or more network nodes and the determined association between the first reference signals and the second reference signals, positioning data associated with the location of the UE.

16. The UE of claim 15, wherein the one or more processors are configured to receive the first reference signals in which the first RAT comprises Long-Term Evolution (LTE).

17. The UE of claim 16, wherein, to receive the second reference signals, the one or more processors are configured to receive NR Positioning Reference Signals (PRS), Channel State Information Reference Signal (CSI-RS), Tracking Reference Signal (TRS), Demodulation Reference Signal (DMRS), or Synchronization Signal Block (SSB).

18. The UE of claim 16, wherein the one or more processors are configured to receive the second reference signals in which the second RAT comprises NR.

19. The UE of claim 18, wherein, to receive the assistance data, the one or more processors are configured to:

receive the assistance data from a serving next generation NodeB (gNB) or a Location Management Function (LMF) server, or perform an Assistance Data Transfer procedure, or a combination thereof.

20. The UE of claim 18, wherein the one or more processors are configured to obtain the configuration data from an LTE Positioning Protocol (LPP) configuration, a Radio Resource Control (RRC) configuration, a Medium Access Control-Control Element (MAC-CE) configuration, or a Downlink Control Information (DCI) configuration, or a combination thereof.

21. The UE of claim 18, wherein, to receive the first reference signals, the one or more processors are configured to receive LTE Cell-specific Reference Signals (CRS).

22. The UE of claim 21, wherein the one or more processors are configured to obtain, from the assistance data, an indication that an NR PRS channel, a Transmission Reception Points (TRPs), or a Frequency layer is associated with the LTE CRS.

23. The UE of claim 21, wherein the one or more processors are configured to obtain, from the configuration data, a QCL relationship between an LTE CRS channel for the LTE CRS and an NR PRS channel for NR PRS.

24. The UE of claim 21, wherein the one or more processors are configured to obtain, from the configuration data, an indication that:

the LTE CRS and NR PRS are on a same antenna port, or the LTE CRS and the NR PRS are on a same antenna port but with a power or phase offset between the LTE CRS and the NR PRS.

25. The UE of claim 15, wherein the one or more processors are configured to obtain, from the configuration data, parameters of a downlink PRS channel, the parameters of the downlink PRS channel comprising a subcarrier spacing, a resource bandwidth, the frequency band, an Absolute Radio Frequency Channel Number (ARFCN), a comb size of a PRS pattern in a resource block, or a PRS Cyclic Prefix of the downlink PRS channel, or a combination thereof.

26. The UE of claim 15, wherein the one or more processors are configured to obtain, from the configuration data:

at least a part of the assistance data received by the UE from a location server, at least a part of high-layer message received by the UE from a serving gNB, or at least a part of dynamic message received by the UE from a serving gNB.

27. The UE of claim 15, wherein the one or more processors are configured to determine the association between the first reference signals and the second reference signals based on configuration data in the first RAT, the second RAT, or both.

28. The UE of claim 15, wherein, to determine the positioning data associated with the location of the UE, the one or more processors are configured to determine reference signal time difference (RSTD), Round Trip signal propagation Time (RTT), Reference Signal Receive Power (RSRP), Observed Time Difference Of Arrival (OTDOA), Down Link (DL) Angle of Departure (AoD), or UE Rx-Tx time difference, or a combination thereof.

29. An apparatus for determining a location of a User Equipment (UE), the apparatus comprising:

means for receiving assistance data indicating transmission of first reference signals of a first Radio Access Technology (RAT) and second reference signals of a second RAT in a frequency band;

means for determining that the first reference signals and the second reference signals are deployed in the frequency band;

means for receiving, from one or more network nodes, the first reference signals and the second reference signals in the frequency band, wherein, for at least one orthogonal frequency-division multiplexing (OFDM) resource block corresponding to the frequency band, resource elements of the at least one OFDM resource block corresponding to the first reference signals form a comb pattern with resource elements of the at least one OFDM resource block corresponding to the second reference signals, the comb pattern comprising a pattern of consecutive symbols within a slot and having a fully frequency-domain staggered pattern;

means for determining an association between the first reference signals and the second reference signals based at least in part on configuration data; and means for determining, based on both the first reference signals and the second reference signals received from the one or more network nodes and the determined association between the first reference signals and the second reference signals, positioning data associated with the location of the UE.

30. A non-transitory computer-readable medium storing instructions for determining a location of a User Equipment (UE), the instructions comprising code for:

receiving assistance data indicating transmission of first reference signals of a first Radio Access Technology (RAT) and second reference signals of a second RAT in a frequency band;

determining that the first reference signals and the second reference signals are deployed in the frequency band;

receiving, from one or more network nodes, the first reference signals and the second reference signals in the frequency band, wherein, for at least one orthogonal frequency-division multiplexing (OFDM) resource block corresponding to the frequency band, resource elements of the at least one OFDM resource block corresponding to the first reference signals form a comb pattern with resource elements of the at least one OFDM resource block corresponding to the second reference signals, the comb pattern comprising a pattern of consecutive symbols within a slot and having a fully frequency-domain staggered pattern;

determining an association between the first reference signals and the second reference signals based at least in part on configuration data; and determining, based on both the first reference signals and the second reference signals received from the one or more network nodes and the determined association between the first reference signals and the second reference signals, positioning data associated with the location of the UE.

* * * * *